(12) United States Patent
Husemann et al.

(10) Patent No.: US 8,889,748 B2
(45) Date of Patent: Nov. 18, 2014

(54) PROCESS FOR PRODUCING EXPANDABLE STYRENE POLYMER COMPOSITIONS

(75) Inventors: Wolfram Husemann, Neustadt (DE); Uwe-Johannes Lehnen, Böhl-Iggelheim (DE); Patrick Spies, Neustadt (DE); Boris Breitscheidel, Limburgerhof (DE); Klaus Hahn, Kirchheim (DE); Jan Holoch, Leimen (DE); Olaf Kriha, Neustadt (DE); Bernhard Schmied, Frankenthal (DE); Pascal Hesse, Mannheim (DE)

(73) Assignee: BASF SE, Ludwigshafen (DE)

( * ) Notice: Subject to any disclaimer, the term of this patent is extended or adjusted under 35 U.S.C. 154(b) by 225 days.

(21) Appl. No.: 13/150,629

(22) Filed: Jun. 1, 2011

(65) Prior Publication Data

US 2011/0291040 A1 Dec. 1, 2011

Related U.S. Application Data

(60) Provisional application No. 61/350,044, filed on Jun. 1, 2010.

(51) Int. Cl.
| | |
|---|---|
| C08L 25/06 | (2006.01) |
| C08J 9/35 | (2006.01) |
| C08K 5/101 | (2006.01) |
| C08J 9/20 | (2006.01) |
| E04B 1/78 | (2006.01) |
| C08J 9/00 | (2006.01) |

(52) U.S. Cl.
CPC ............... *C08J 9/0023* (2013.01); *C08K 5/101* (2013.01); *C08J 2325/04* (2013.01)
USPC .............................................. 521/56; 252/62

(58) Field of Classification Search
USPC ........... 521/50, 56, 57, 60, 146; 524/284, 285
See application file for complete search history.

(56) References Cited

U.S. PATENT DOCUMENTS

| | | | | |
|---|---|---|---|---|
| 4,086,191 A | * | 4/1978 | Hinselmann et al. | 521/57 |
| 4,238,570 A | * | 12/1980 | Shibata et al. | 521/57 |
| 4,393,146 A | * | 7/1983 | Rigler et al. | 521/56 |
| 5,064,874 A | | 11/1991 | Motani et al. | |
| 5,182,308 A | | 1/1993 | Voelker et al. | |
| 6,310,109 B1 | * | 10/2001 | Gluck et al. | 521/56 |
| 2007/0112081 A1 | * | 5/2007 | Hahn et al. | 521/56 |
| 2007/0173554 A1 | | 7/2007 | Delaviz et al. | |
| 2010/0113664 A1 | * | 5/2010 | Bradshaw et al. | 524/298 |
| 2010/0273907 A1 | * | 10/2010 | Frenzel et al. | 521/160 |
| 2010/0286297 A1 | | 11/2010 | Ortalda et al. | |

FOREIGN PATENT DOCUMENTS

| | | | |
|---|---|---|---|
| EP | 0832933 | * | 1/1998 |
| EP | 2058361 A1 | | 5/2009 |
| JP | H01-079238 | | 3/1989 |
| KP | 20070103824 | * | 4/2009 |
| WO | WO 2009053450 A1 | * | 4/2009 |
| WO | WO 2009070399 | * | 4/2009 |
| WO | WO-2009068515 A1 | | 6/2009 |
| WO | WO 2009070399 A1 | * | 6/2009 |
| WO | WO 2010034778 A1 | * | 4/2010 |
| WO | WO-2011151301 | | 12/2011 |

OTHER PUBLICATIONS

Braun et al. Thermoplastic Compositions with Processing Characteristics. WO 2010034778A1. Published Apr. 1, 2010. In German. See Figure (I) p. 5.*

Braun, D.; Hempler, P. "Chain transfer constants of some aliphathic agents in the polymerization of styrene and methylmethacrylate" Polymer Bulletin 30, 55-60 (1993).*

Waide, P. "Refrigerators: developments in the European market" from "Energy Efficiency in Household Appliances" P. Bertoldi et al., eds. Springer-Verlag, 1999. p. 231-247.*

Derwent patent publication abstract, 2007KR-103824. Published Apr. 2009. Thompson Reuters.*

International Search Report for PCT/EP2011/058885, dated Aug. 2, 2011.

English translation of the IPRP for the for PCT/EP2011/058885, dated Dec. 1, 2012.

* cited by examiner

*Primary Examiner* — Randy Gulakowski
*Assistant Examiner* — Christina Wales
(74) *Attorney, Agent, or Firm* — Drinker Biddle & Reath LLP

(57) ABSTRACT

A composition comprising at least one expandable styrene polymer component and at least one cyclohexanecarboxylic ester and also optionally further components can be processed to mechanically robust foam materials.

12 Claims, No Drawings

PROCESS FOR PRODUCING EXPANDABLE STYRENE POLYMER COMPOSITIONS

CROSS-REFERENCE TO RELATED APPLICATIONS

This Application claims the benefit of U.S. Provisional Application 61/350,044 filed on Jun. 1, 2010 which is incorporated by reference.

BACKGROUND OF THE INVENTION

The present invention relates to expandable styrene polymer compositions, to processes for producing expandable styrene polymers, and to products having high mechanical robustness. The invention further relates to processes for producing styrene polymer foam materials, to the expandable styrene polymers and also the styrene polymer foam materials themselves, and to the various uses of the expandable styrene polymers and of the foam materials.

Various foam materials have been used for decades as materials of construction for a variety of applications. Starting products suitable for producing foam materials include styrene, butadiene, and other unsaturated compounds. With the monomers it is possible to obtain polymers which then, often with use of a blowing agent, can be converted, with expansion, into foam materials.

In the course of the operation of producing them, expandable styrene polymers, i.e., more particularly, polymers having a fraction of at least 50 percent of styrene units in the polymer, are often admixed with further components, e.g., auxiliary components, such as white oil. This has proven advantageous for styrene homopolymers as well.

In this context, further components are added frequently in an amount of 0.05%-5% for purposes which include that of enhancing the foam-forming behavior of the polymers. White oils (in other words paraffins) also act as flow improvers and plasticizers. These components also lower the glass transition temperature of the polymer matrix. The use of white oils in the production of expandable polymers also has drawbacks.

The term "white oil" may be understood to encompass a liquid mixture of aliphatic, linear or branched hydrocarbons or functionalized hydrocarbons (generally having an average molar mass of around 300-3000 g/mol). The molar mass distribution of different white oil batches and grades may also be subject to great fluctuations.

The selection of the further component has consequences for the properties of the foam material and for the processing quality of the expandable composition. Where, for example, the white oil has a relatively high low-molecular-mass fraction, the glass transition point of the polymer in which it is used will be lowered. As a consequence, the resultant expandable styrene polymer composition may exhibit highly divergent expansion characteristics.

The styrene polymer foam materials obtained then also have different mechanical strengths. A further drawback of the known use of white oil is that, when other additives are added with white oil, the expandable styrene polymer composition exhibits a marked deterioration in mechanical strength, such as compressive strength and flexural strength, as compared with a styrene polymer foam without white oil.

Various methods are described in the prior art for how further components (auxiliaries for polymers) may be obtained. Thus, for example, WO 1999/32427 describes a process for hydrogenating benzene polycarboxylic acids, in which various cyclohexanecarboxylic esters are obtained. These reaction products can be used as plasticizers in plastics.

DE-A 10 032 580 describes plasticizers, for various plastics, that can be obtained starting from phthalic esters.

BRIEF SUMMARY OF THE INVENTION

It is an object of the present invention to provide expandable styrene polymer compositions which result in improved mechanical robustness on the part of the foam materials. A further intention is that the quality and the properties of the expandable styrene polymers (and of the compositions) and of the styrene polymer foam materials which are (or which can be) produced therefrom should be controllable through addition of specific plasticizers. By styrene polymers are meant polystyrene and those copolymers of styrene which comprise in copolymerized form at least 50 percent by weight of styrene. Comonomers contemplated include, in particular, alpha-methylstyrene, ring-alkylated styrenes, ring-halogenated styrenes, acrylonitrile, esters of acrylic acid and of methacrylic acid with C1-C8 alcohols, N-vinyl compounds such as vinylcarbazole, maleic anhydride, and also compounds having two polymerizable double bonds (e.g., small amounts of butadiene, divinylbenzene or butanediol diacrylate).

Surprisingly it has been found that certain cyclohexanecarboxylic esters have a very positive influence on the foaming behavior and at the same time on the mechanical foam-material properties of styrene polymers, such as EPS (Expandable PolyStyrene, such as Styropor). In particular, the use of the commercial product Hexamoll Dinch (manufacturer: BASF SE, Germany), which is already known as a plasticizer for PVC, results, surprisingly, in improved styrene polymer compositions and foams.

DETAILED DESCRIPTION OF THE INVENTION

Through the addition even of small amounts of cyclohexanecarboxylic esters, such as Hexamoll Dinch, for example, not only is it possible to improve the expansion behavior of EPS, but at the same time it is also possible to produce better compressive strengths and flexural strengths in the particle foam materials obtained therefrom.

Hexamoll Dinch, as diisononyl cyclohexanedicarboxylate, comprises a chemical compound (frequently a mixture of a plurality of isomers), and not a complex hydrocarbons mixture, such as white oil, for example. Cyclohexanecarboxylic esters of this kind, such as Hexamoll Dinch, for example, can be produced and supplied in consistent quality and with high degrees of purity. The use of Hexamoll Dinch in polymers such as PVC is described in DE 20021356 U1.

For producing the styrene polymer compositions and the foam products (EPS), Hexamoll Dinch may be used, for example, in an EPS suspension process. It has been found that, without inconvenient adaptation of the formula of the composition, the known white oil component can be substituted in the polymerization by Hexamoll Dinch (for example, using a "drop-in solution"). The resultant styrene polymer composition (e.g., raw EPS material) exhibits significantly improved foamability and possesses higher compressive strengths and flexural strengths than the comparison product produced using white oil.

One way in which the various objects of the invention are achieved is through the provision of a process for producing expandable styrene polymer compositions which comprises polymerizing at least one styrene monomer (and optionally further monomers such as AMS, butadiene and/or acrylonitrile) using at least one cyclohexanecarboxylic ester. Cyclohexanecarboxylic esters are compounds which have a cyclohexane ring and two or more carboxylic ester groups.

The invention relates to a composition comprising at least one expandable styrene polymer component (S) and at least one cyclohexanecarboxylic ester, and also optionally further components. The invention relates more particularly to a composition which comprises at least one cyclohexanecarboxylic ester of the formula (I). It comprises preferably 100 ppm to 10.0% by weight (and more particularly 100 ppm to 5.0% by weight, also frequently 150 ppm to 3.0% by weight) of at least one cyclohexanecarboxylic ester of the formula (I),

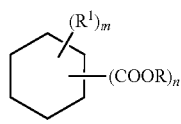

(I)

in which:
R$^1$ is C$_1$-C$_{10}$ alkyl or C$_3$-C$_8$ cycloalkyl; preferably C$_1$-C$_{10}$ alkyl;
m is 0, 1, 2 or 3; preferably 0 to 2, more particularly 0 or 1;
n is 2, 3 or 4; preferably 2 or 3, more particularly 2;
R is C$_{10}$-C$_{30}$ alkyl, preferably C$_1$-C$_{20}$ alkyl.

Also provided by the invention is a composition which comprises at least 50% by weight (more particularly at least 80% by weight, frequently even at least 90% by weight) of a styrene polymer (S), this polymer being composed of at least 80 percent by weight of styrene monomers (frequently of more than 90 percent), the composition further comprising 100 ppm to 5.0% by weight (frequently also 150 ppm to 3.0% by weight) of at least one cyclohexanecarboxylic ester of the formula (I) in which:
R$^1$ is C$_1$-C$_{10}$ alkyl;
m is 0, 1 or 2;
n is 2 or 3;
R is C$_6$-C$_{12}$ alkyl.

The invention also relates to a composition which comprises at least 80% by weight (frequently also at least 90% by weight) of a styrene polymer (S), composed of at least 95 percent by weight of styrene monomers, the composition further comprising 150 ppm to 3.0% by weight of at least one cyclohexanecarboxylic ester of the formula (I) in which:
R$^1$ is C$_1$-C$_{10}$ alkyl;
m is 0 or 1; more particularly 0;
n is 2 or 3; more particularly 2;
R is C$_6$-C$_{12}$ alkyl.

The invention also relates to a composition which comprises at least 90% by weight of a styrene homopolymer (S), the composition further comprising 150 ppm to 3.0% by weight of at least one cyclohexanecarboxylic ester of the formula (I) in which:
R$^1$ is C$_1$-C$_{10}$ alkyl;
m is 0 or 1; more particularly 0;
n is 2 or 3; more particularly 2;
R is C$_6$-C$_{12}$ alkyl, more particularly C$_8$-C$_{10}$ alkyl,
the composition optionally comprising up to 8% by weight of one or more further components, such as blowing agents (for instance pentane), flame retardants (for instance phosphorus-containing compounds), flame retardant synergists (for instance PTFE), branching auxiliaries, initiators and/or graphite. More particularly, a graphite content of 0.1% to 5% by weight may give the composition particular properties.

The invention also relates to a composition which comprises at least 90% by weight of a styrene homopolymer (S) and which further comprises 150 ppm to 3.0% by weight of at least one cyclohexanecarboxylic ester of the formula (I) in which m is 0, n is 2, and R is C$_8$-C$_{10}$ alkyl, the composition comprising 0.1% to 8% by weight (frequently also 0.1% to 5% by weight) of one or more further components.

For the compositions of the invention the combined use of two specific additives has proven particularly advantageous, the use of a small amount (more particularly 50 to 500 ppm) of one or more branching auxiliaries (especially divinylbenzenes (such as ortho-, meta-, and para-divinylbenzene) or butanediol esters (such as 1,4-butanediol methacrylate, 1,4-butanediol dimethacrylate) or 1,4-butanediol divinyl ether or dihydro-dicyclopentadienyl acrylate) together with, for example, 100 ppm to 5.0% by weight of at least one cyclohexanecarboxylic ester of the formula (I).

The invention also relates to a process for producing expandable styrene polymer compositions, in which the styrene monomers (and optionally further monomers) are polymerized using at least one cyclohexanecarboxylic ester of the general formula (I)

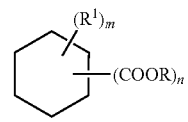

(I)

in which:
R$^1$ is C$_1$-C$_{10}$ alkyl or C$_3$-C$_8$ cycloalkyl;
m is 0, 1, 2 or 3;
n is 2, 3 or 4;
R is C$_1$-C$_{30}$ alkyl;
preferably C$_1$-C$_{20}$ alkyl, more particularly C$_6$-C$_{12}$ alkyl, more particularly C$_8$-C$_{10}$ alkyl.

The invention also relates to a process for producing expandable styrene polymer compositions, where the following components are employed in the polymerization, the percent by weight being based on the total amount of all the organic components:
(A) 10 ppm to 10% by weight of at least one cyclohexanecarboxylic ester,
(B) at least 50% by weight (frequently at least 80% by weight) of styrene monomers, and
(C) optionally up to 8% by weight of further components.

The process may as one step include the dispersing of a vinylaromatic compound (such as styrene) in water, addition of at least one cyclohexanecarboxylic ester and also optionally of further components, implementation of the suspension polymerization, and recovery of the styrene polymer particles. In the polymerization, as further components, there is frequently at least one blowing agent (in an amount, for example, of 1 to 10, more particularly 4 to 8 percent by weight) and/or at least one initiator (in an amount, for example, of 0.1 to 1 percent by weight) present. Production, however, can also be implemented in principle by means of a melt impregnation process.

The invention also relates to a process for producing expandable styrene polymer compositions, in which the cyclohexanecarboxylic ester comprises at least one diisononyl 1,2-cyclohexanedicarboxylate. Frequently a mixture of constitutional isomers of diisononyl 1,2-cyclohexanedicarboxylates is used, more particularly Hexamoll Dinch.

Also provided is a process for producing expandable styrene polymer compositions, in which further components used comprise at least one component selected from the group consisting of blowing agents, flame retardants, flame retardant synergists, branching auxiliaries, initiators, and graphite. Typical amounts for these components are situated in a range from 0.01% to 4% by weight. As further components it is also possible to use further plasticizers.

The invention also relates to a process for producing a foam material, in which a composition as described above is foamed. This may be done, for example, by thermal treatment. Also provided by the invention is a process for producing shaped parts, by means, for example, of partial prefoaming of the styrene polymer composition and subsequent welding of the polymer particles.

The invention also provides a foam material producible by foaming a composition as described above. The foaming material producible (and that produced) by thermally foaming a composition as described above is also provided by the invention. It preferably has a density of 8.0 to 200 g/l, more particularly of 10 to 50 g/l.

The invention also relates to the various uses of a foam material as described above, more particularly for heat retention, for thermal insulation of machinery and household appliances, as a shaped part or as packaging material.

Also of interest is the use of a cyclohexanecarboxylic ester of the formula (I), more particularly of diisononyl 1,2-cyclohexanedicarboxylates, more particularly of Hexamoll Dinch, for producing expandable styrene polymer compositions and styrene polymer foams.

The cyclohexanecarboxylic acid derivatives used are prepared in accordance, for example, with the process disclosed in WO 1999/32427. That process comprises hydrogenating a benzenepolycarboxylic acid or derivative thereof (or a mixture of two or more thereof) by contacting the benzenepolycarboxylic acid or derivative thereof, or the mixture of two or more thereof, with a hydrogen-containing gas in the presence of a catalyst which as its active metal comprises at least one metal from transition group VIII of the Periodic Table, alone or together with at least one metal from transition group I or VII of the Periodic Table, applied to a support. The support may have macropores. In one preferred embodiment the support has an average pore diameter of at least 50 nm and a BET surface area of not more than 30 m²/g. The amount of the active metal is 0.01% to 30% by weight, based on the total weight of the catalyst. In one embodiment a catalyst is used in which the amount of the active metal is 0.01% to 30% by weight, based on the total weight of the catalyst, and 10% to 50% of the pore volume of the support is formed by macropores having a pore diameter in the range from 50 nm to 10 000 nm, and 50% to 90% of the pore volume of the support is formed by mesopores having a pore diameter in the range from 2 to 50 nm, the sum of the fractions of the pore volumes adding up to 100%. In a further embodiment the catalyst contains 0.01% to 30% by weight, based on the total weight of the catalyst, of an active metal, applied to a support, the support having an average pore diameter of at least 0.1 μm and a BET surface area of not more than 15 m²/g. As supports it is possible in principle to use all supports which have macropores, i.e., supports which contain exclusively macropores, and also those which include mesopores and/or micropores as well as macropores.

As active metal it is possible in principle to use all metals from transition group VIII of the Periodic Table. Preferred active metals used are platinum, rhodium, palladium, cobalt, nickel or ruthenium or a mixture of two or more of these, with ruthenium being used more particularly as active metal. Among the metals of transition group I or VII or else of transition groups I and VII of the Periodic Table that can likewise be used, which can likewise all be used in principle, preference is given to the use of copper and/or rhenium. The terms "macropores" and "mesopores" are used in the way in which they are defined in Pure Appl. Chem., 45 p. 79 (1976), namely as pores whose diameter is above 50 nm (macropores) or whose diameter is between 2 nm and 50 nm (mesopores).

The amount of the active metal is generally 0.01% to 30%, preferably 0.01% to 5%, more preferably 0.1% to 5%, by weight, based in each case on the total weight of the catalyst used.

The term "benzenepolycarboxylic acid or derivative thereof" that is used encompasses all benzenepolycarboxylic acids per se—for example, phthalic acid, isophthalic acid, terephthalic acid, trimellitic acid, trimesic acid, hemimellitic acid, and pyromellitic acid, and derivatives thereof, particular mention being made of mono-, di-, tri-, and tetra-esters, more particularly alkyl esters, and anhydrides. Preference is given to the alkyl esters of the stated acids, the alkyl group being preferably a radical R as defined above. The benzenepolycarboxylic acid alkyl esters used with preference are prepared generally by reacting benzenepolycarboxylic acids with the alcohols corresponding to the alkyl groups of the esters. Suitable reaction conditions for the reaction of the benzenepolycarboxylic acids with the corresponding alcohols are known to the skilled person.

The present specification further provides, very generally, the use of cyclohexanecarboxylic acid derivatives as plasticizers for styrene polymers.

The cyclohexanecarboxylic acid derivatives used in accordance with the invention are preparable for example by the following process:

a) esterifying a benzenepolycarboxylic acid of the formula II

in which
R¹ is $C_1$-$C_{30}$ alkyl or $C_3$-$C_8$ cycloalkyl,
m is 0, 1, 2 or 3, and
n is 2, 3 or 4,
with one or more alcohols of the general formula

R—OH.

In this formula, R is $C_1$-$C_{30}$ alkyl; preferably $C_1$-$C_{20}$ alkyl,
more particularly $C_6$-$C_{12}$ alkyl,
more particularly $C_8$-$C_{10}$ alkyl.

This gives a benzenepolycarboxylic ester of the formula III.

b) hydrogenating the benzenepolycarboxylic ester of the formula III to give a corresponding cyclohexanecarboxylic ester of the general formula (I).

Preferred embodiments of $R^1$, m, n, and R are mentioned for the cyclohexanecarboxylic esters of formula (I). Benzenepolycarboxylic acids used with preference are phthalic acid, isophthalic acid, terephthalic acid, trimellitic acid, trimesic acid, hemimellitic acid, and pyromellitic acid. Very particular preference is given to using phthalic acid. The acids referred to above are available commercially.

Alcohols used are preferably the alcohols corresponding to the radicals R in the cyclohexanecarboxylic acid derivatives of the formula (I). It is therefore preferred to use linear or branched alcohols having $C_1$-$C_{30}$ alkyl radicals. The alcohols used for esterification with the benzenepolycarboxylic acids may in each case be the individual isomers of the alcohols, corresponding to the aforementioned radicals R, or may be mixtures of different alcohols with isomeric alkyl radicals having the same number of carbon atoms, and/or may be mixtures of different alcohols having different numbers of carbon atoms. The alcohols or alcohol mixtures that are suitable for reaction with the benzenepolycarboxylic acids may be prepared by all of the processes that are known to the skilled person. Suitable processes for preparing alcohols, or process steps employed in the preparation of alcohols, are, for example, the following:

hydroformylation with subsequent hydrogenation of the aldehydes formed, for example as disclosed in WO 92/13818, DE-A 2 009 505, DE-A 199 24 339, EP-A 1 113 034, WO 00/63151, WO 99/25668, JP-A 1 160 928, JP-A 03 083 935, JP-A 2000/053803, EP-A 0 278 407, EP-A 1 178 029, FR-A 1 304 144, JP-A 30 44 340, JP-A 30 44 341, JP-A 30 44 342, JP-A 0 40 36 251, GB-A 721,540, DE-A 195 304 14, JP-A 2001/049029, U.S. Pat. No. 2,781,396, U.S. Pat. No. 3,094,564, FR-A 1 324 873, JP-A 0 816 9854, U.S. Pat. No. 3,153,673, U.S. Pat. No. 3,127,451, U.S. Pat. No. 1,828,344, WO 2003/66642, WO 2003/18912, EP-A 0 424 767, WO 2002/68369, EP-A 0 366 089, JP-A 2001/002829, DE-A 100 35 617, DE-A 199 55 593, WO 2002/00580, EP-A 0 643 031, U.S. Pat. No. 2,876,264, JP-A 2000/319444 and DE-A 100 32 580;

hydrogenation of aldol products, for example as disclosed in DE-A 102 51 311, JP-A 05 194 761, U.S. Pat. No. 3,272,873, DE-A 3 151 086, JP-A 2001/322959, WO 98/03462 and EP-A 0 603 630;

hydration of alkenes, for example as disclosed in U.S. Pat. No. 5,136,108, EP-A 0 325 144, EP-A 0 325 143, DE-A 100 50 627, U.S. Pat. No. 4,982,022, GB-A 2,187,741, DE-A 36 28 008, U.S. Pat. No. 3,277,191, JP-A 2000/191 566, DE-A 854 377, DE-A 38 01 275, DE-A 39 25 217, JP-A 06 321 828, JP-A 02 088 536, JP-A 06 287 156, JP-A 06 287 155, JP-A 54 141 712, JP-A 08 283 186, JP-A 09 263 558 and U.S. Pat. No. 4,684,751;

hydrogenation of carboxylic acids and carboxylic esters, especially fatty acids and fatty acid esters, for example as disclosed in U.S. Pat. No. 5,463,143, U.S. Pat. No. 5,475,159, WO 94/10112, CA 2,314,690, WO 94/06738, JP-A 06 065 125 and U.S. Pat. No. 3,361,832;

hydrogenation of unsaturated alcohols or of carbonyl compounds, for example as disclosed in EP-A 0 394 842, DE-A 1 269 605, WO 88/05767, FR-A 1,595,013, EP-A 0 326 674, BE-A 756 877, BE-A 757 561, DE-A 1 277 232, FR-A 1,499,041 and DE-A 1 276 620;

hydrogenation of epoxides, for example as disclosed in FR-A 1,508,939, GB-A 879 803 and DE-A 1 078 106;

processes comprising a telomerization step, for example as disclosed in EP-A 0 330 999, DE-A 1 138 751, U.S. Pat. No. 5,908,807, NE-6,603,884 and U.S. Pat. No. 3,091,628;

processes comprising an isomerization step, for example as disclosed in DE-A 42 28 887;

hydrolysis of sulfates, for example as disclosed in GB-A 1,165,309;

reaction of dienes with amines, for example as disclosed in DE-A 44 31 528;

enzymatic preparation of alcohols, for example as disclosed in WO 93/24644;

selective hydrogenation of dienes, for example as disclosed in U.S. Pat. No. 3,203,998, DE-A 21 41 186, GB-A 2,093,025, JP-A 02 129 24, JP-A 1 122 8468, DE-A 195 44 133, WO 94/00410, GB-A 2,260,136, DE-A 44 10 746 and JP-A 08 176 036;

preparation of alcohols from nitriles, for example as disclosed in EP-A 0 271 092;

preparation of alcohols by reaction of alkynes, for example as disclosed in RU 205 9597-C1; and hydrogenolysis of substituted tetrahydropyrans, for example as disclosed in GB 1,320,188.

The skilled person is aware of further processes for preparing alcohols that can likewise be used for preparing alcohols or alcohol mixtures that are suitable for esterification with benzenepolycarboxylic acids. Alcohols used with preference are—as mentioned above—alcohols which contain $C_1$-$C_{20}$ alkyl radicals. In particular the relatively long-chain $C_6$-$C_{12}$ alcohols or alcohol mixtures which comprise these alcohols are prepared with particular preference by catalytic hydroformylation (also referred to as the oxo process) of olefins and subsequent hydrogenation of the aldehydes formed. Suitable hydroformylation processes are known to the skilled person and are disclosed in the documents identified above. The alcohols and alcohol mixtures disclosed in the documents identified can be reacted with the aforementioned benzenepolycarboxylic acids to give the desired benzenepolycarboxylic acid alkyl esters and ester mixtures.

Mixtures comprising $C_8$ alcohols and the processes for preparing them are disclosed for example in GB-A 721 540, which describes a process for preparing isooctyl alcohols starting from heptenes by means of hydroformylation and subsequent hydrogenation.

$C_9$ alcohols and mixtures comprising $C_9$ alcohols are prepared preferably by dimerizing butenes, hydroformylating the resultant octenes, and subsequently hydrogenating the resultant $C_9$ aldehyde. Suitable processes and mixtures comprising $C_9$ alcohols are disclosed for example in WO 1992/13818, DE-A 20 09 505, DE-A 199 24 339, EP-A 1 113 034, WO 2000/63151, WO 1999/25668, JP-A 1 160 928, JP-A 03 083 935, JP-A 2000/053803, EP-A 0 278 407 and EP-A 1 178 029.

$C_{10}$ alcohols and mixtures comprising these alcohols are disclosed for example in WO 2003/66642, WO 2003/18912, EP-A 0 424 767, WO 2002/68369, EP-A 0 366 089 and JP-A 2001/002829. $C_{12}$ alcohols and mixtures comprising $C_{12}$ alcohols, more particularly trimethylnonanol, and a process for its preparation are disclosed for example in WO 98/03462, $C_{13}$ alcohols and mixtures comprising these alcohols are disclosed for example in DE-A 100 32 580, DE-A 199 55 593 and WO 2002/00580.

In accordance with the present specification, particular preference is given to using dialkyl esters of the aforementioned cyclohexanedicarboxylic acids, more particularly 1,2-, 1,3- or 1,4-dialkyl esters and especially 1,2-dialkyl esters. In this context it is possible to use dialkyl esters in which both ester groups of the dialkyl esters carry the same alkyl radicals, and also ester groups in which the two ester groups of the dialkyl esters carry different alkyl groups. Examples of mixed and non-mixed dialkyl esters of cyclohexanedicarboxylic acids have already been given above.

It is also possible for the alkyl groups of the cyclohexanedicarboxylic acid alkyl esters to have the same number of carbon atoms and yet to be linear or have different branches and so to form isomer mixtures. Isomer mixtures of this kind can also be used if the number of carbons in the alkyl groups of the dialkyl esters is different. The fraction of the various isomers of the alkyl groups is generally a product of the composition of the alcohols used for the esterification of the benzenedicarboxylic acids, which, following esterification, are hydrogenated to form the cyclohexanedicarboxylic esters. Suitable alcohol mixtures have already been specified above. For the purposes of the present specification, therefore, linear or branched alkyl radicals having a particular number of carbon atoms comprehend not only the individual isomers but also isomer mixtures whose composition—as mentioned above—is a product of the composition of the alcohols used for esterifying the benzenedicarboxylic acids. Linear alkyl radicals for the purposes of the present specification are exclusively linear alkyl radicals, but also mixtures of alkyl radicals which are predominantly linear.

Where the alkyl radicals R of the cyclohexanecarboxylic esters are $C_6$ to $C_{12}$ alkyl radicals, it is preferred to use $C_6$ to $C_{12}$ alcohols which have degrees of branching (ISO index) of generally 0.10 to 4, preferably 0.5 to 3, more preferably 0.8 to 2 and more particularly 1 to 1.5; in other words, in general, the respective alcohols are mixtures of different isomers. Very particular preference is given to using C9 alcohol mixtures with an ISO index of 1 to 1.5, more particularly nonanol mixtures with an ISO index of 1.25 or 1,6. The ISO index is a dimensionless variable which has been determined by means of gas chromatography.

Further provided are cyclohexanecarboxylic esters preparable by a process comprising the steps of a) esterifying a benzenepolycarboxylic acid of the formula II

(II)

in which $R^1$, m, and n are as defined above, with one or more alcohols of the formula

R'—OH in which

R' is $C_6$-$C_{12}$ alkyl, the alkyl radicals R' having degrees of branching of 0.1 to 4, preferably 0.5 to 3, more preferably 0.8 to 2, very preferably 1 to 1.5 (ISO index), to give a benzenepolycarboxylic ester of the formula III'

(III')

b) hydrogenating the benzenepolycarboxylic ester of the formula III' to give a corresponding cyclohexanecarboxylic ester.

Preferred alcohols R'—OH, more particularly nonanol mixtures, are the above-mentioned alcohols and alcohol mixtures. Preferred embodiments of $R^1$, m, and n are mentioned above with regard to the cyclopolycarboxylic esters of formula I. Selected examples of cyclohexanecarboxylic esters which can be used in accordance with the invention are the following compounds:

2-propylheptyl n-octyl cyclohexane-1,2-dicarboxylate, n-decyl n-octyl cyclohexane-1,2-dicarboxylate, isodecyl n-octyl cyclohexane-1,2-dicarboxylate, n-undecyl n-octyl cyclohexane-1,2-dicarboxylate, isoundecyl n-octyl cyclohexane-1,2-dicarboxylate, n-dodecyl n-octyl cyclohexane-1,2-dicarboxylate, isododecyl n-octyl cyclohexane-1,2-dicarboxylate, n-tridecyl n-octyl cyclohexane-1,2-dicarboxylate, isotridecyl n-octyl cyclohexane-1,2-dicarboxylate, 2-ethylhexyl isooctyl cyclohexane-1,2-dicarboxylate, n-nonyl isooctyl cyclohexane-1,2-dicarboxylate, isononyl isooctyl cyclohexane-1,2-dicarboxylate, 2-propylheptyl isooctyl cyclohexane-1,2-dicarboxylate, n-decyl isooctyl cyclohexane-1,2-dicarboxylate, isodecyl isooctyl cyclohexane-1,2-dicarboxylate, n-undecyl isooctyl cyclohexane-1,2-dicarboxylate, isoundecyl isooctyl cyclohexane-1,2-dicarboxylate, n-dodecyl isooctyl cyclohexane-1,2-dicarboxylate, isododecyl isooctyl cyclohexane-1,2-dicarboxylate, n-tridecyl isooctyl cyclohexane-1,2-dicarboxlyate, isotridecyl isooctyl cyclohexane-1,2-dicarboxylate, n-nonyl 2-ethylhexyl cyclohexane-1,2-dicarboxylate, isononyl 2-ethylhexyl cyclohexane-1,2-dicarboxylate, 2-propylheptyl 2-ethylhexyl cyclohexane-1,2-dicarboxylate, n-decyl 2-ethylhexyl cyclohexane-1,2-dicarboxylate, isodecyl 2-ethylhexyl cyclohexane-1,2-dicarboxylate, n-undecyl 2-ethylhexyl cyclohexane-1,2-dicarboxylate, isoundecyl 2-ethylhexyl cyclohexane-1,2-dicarboxylate, n-dodecyl 2-ethylhexyl cyclohexane-1,2-dicarboxylate, isododecyl 2-ethylhexyl cyclohexane-1,2-dicarboxylate, n-tridecyl 2-ethylhexyl cyclohexane-1,2-dicarboxylate, isotridecyl 2-ethylhexyl cyclohexane-1,2-dicarboxylate, isononyl n-nonyl cyclohexane-1,2-dicarboxylate, 2-propylheptyl n-nonyl cyclohexane-1,2-dicarboxylate, n-decyl n-nonyl cyclohexane-1,2-dicarboxylate, isodecyl n-nonyl cyclohexane-1,2-dicarboxylate, n-undecyl n-nonyl cyclohexane-1,2-dicarboxylate, isoundecyl n-nonyl cyclohexane-1,2-dicarboxylate, n-dodecyl n-nonyl cyclohexane-1,2-dicarboxylate, isododecyl n-nonyl cyclohexane-1,2-dicarboxylate, n-tridecyl n-nonyl cyclohexane-1,2-dicarboxylate, isotridecyl n-nonyl cyclohexane-1,2-dicarboxylate, 2-propylheptyl isononyl cyclohexane-1,2-dicarboxylate, n-decyl isononyl cyclohexane-1,2-dicarboxylate, isodecyl isononyl cyclohexane-1,2-dicarboxylate, n-undecyl isononyl cyclohexane-1,2-dicarboxylate, isoundecyl isononyl cyclohexane-1,2-dicarboxylate, n-dodecyl isononyl cyclohexane-1,2-dicarboxylate, isododecyl isononyl cyclohexane-1,2- dicarboxylate, n-tridecyl isononyl cyclohexane-1,2-dicarboxylate, isotridecyl iso-nonyl cyclohexane-1,2-dicarboxylate, n-decyl 2-propylheptyl cyclohexane-1,2-dicarboxylate, isodecyl 2-propylheptyl cyclohexane-1,2-dicarboxylate, n-undecyl 2-propylheptyl cyclohexane-1,2-dicarboxylate, isoundecyl 2-propylheptyl cyclohexane-1,2-dicarboxylate, n-dodecyl 2-propylheptyl cyclohexane-1,2-dicarboxylate, isododecyl 2-propylheptyl cyclohexane-1,2-dicarboxylate, n-tridecyl 2-propylheptyl cyclohexane-1,2-dicarboxylate, isotridecyl 2-propylheptyl cyclohexane-1,2-dicarboxylate, isodecyl n-decyl cyclohexane-1,2-dicarboxylate, n-undecyl n-decyl cyclohexane-1,2-dicarboxylate, isoundecyl n-decyl cyclohexane-1,2-dicarboxylate, n-dodecyl n-decyl cyclohexane-1,2-dicarboxylate, isododecyl n-decyl cyclohexane-1,2-dicarboxylate, n-tridecyl n-decyl cyclohexane-1,2-dicarboxylate, isotridecyl n-decyl cyclohexane-1,2-dicarboxylate, n-undecyl isodecyl cyclohexane-1,2-dicarboxylate, isoundecyl iso-decyl cyclohexane-1,2-dicarboxylate, n-dodecyl isodecyl cyclohexane-1,2-dicarboxylate, isododecyl isodecyl cyclohexane-1,2-dicarboxylate, n-tridecyl isodecyl cyclohexane-1,2-dicarboxylate, isotridecyl isodecyl cyclohexane-1,2-dicarboxylate, isoundecyl n-undecyl cyclohexane-1,2-dicarboxylate, n-dodecyl n-undecyl cyclohexane-1,2-dicarboxylate, isododecyl n-undecyl cyclohexane-1,2-dicarboxylate, n-tridecyl n-undecyl cyclohexane-1,2-dicarboxylate, isotridecyl n-undecyl cyclohexane-1,2-dicarboxylate, n-dodecyl isoundecyl cyclohexane-1,2-dicarboxylate, isododecyl isoundecyl cyclohexane-1,2-dicarboxylate, n-tridecyl iso-undecyl cyclohexane-1,2-dicarboxylate, isotridecyl isoundecyl cyclohexane-1,2-dicarboxylate, isododecyl n-dodecyl cyclohexane-1,2-dicarboxylate, n-tridecyl n-dodecyl cyclohexane-1,2-dicarboxylate, isotridecyl n-dodecyl cyclohexane-1,2-dicarboxylate, n-tridecyl isododecyl cyclohexane-1,2-dicarboxylate, isotridecyl isododecyl cyclohexane-1,2-dicarboxylate, isotridecyl n-tridecyl cyclohexane-1,2-dicarboxylate, methyl cyclohexyl cyclohexane-1,2-dicarboxylate, ethyl cyclohexyl cyclohexane-1,2-dicarboxylate, n-propyl cyclohexyl cyclohexane-1,2-dicarboxylate, isopropyl cyclohexyl cyclohexane-1,2-dicarboxylate, n-butyl cyclohexyl cyclohexane-1,2-dicarboxylate, tert-butyl cyclohexyl cyclohexane-1,2-dicarboxylate, isobutyl cyclohexyl cyclohexane-1,2-dicarboxylate, glycol cyclohexyl cyclohexane-1,2-dicarboxylate, n-hexyl cyclohexyl cyclohexane-1,2-dicarboxylate, isohexyl cyclohexyl cyclohexane-1,2-dicarboxylate, n-heptyl cyclohexyl cyclohexane-1,2-dicarboxylate, isoheptyl cyclohexyl cyclohexane-1,2-dicarboxylate, n-octyl cyclohexyl cyclohexan-1,2-dicarboxylate, isooctyl cyclohexyl cyclohexane-1,2-dicarboxylate, 2-ethylhexyl cyclohexyl cyclohexane-1,2-dicarboxylate, n-nonyl cyclohexyl cyclohexane-1,2-dicarboxylate, isononyl cyclohexyl cyclohexane-1,2-dicarboxylate, 2-propylheptyl cyclohexyl cyclohexane-1,2-dicarboxylate, n-decyl cyclohexyl cyclohexane-1,2-dicarboxylate, isodecyl cyclohexyl cyclohexane-1,2-dicarboxylate, n-undecyl cyclohexyl cyclohexane-1,2-dicarboxylate, isoundecyl cyclohexyl cyclohexane-1,2-dicarboxylate, n-dodecyl cyclohexyl cyclohexane-1,2-dicarboxylate, isododecyl cyclohexyl cyclohexane-1,2-dicarboxylate, n-tridecyl cyclohexyl cyclohexane-1,2-dicarboxylate, isotridecyl cyclohexyl cyclohexane-1,2-dicarboxylate, methyl isopentyl cyclohexane-1,2-dicarboxylate, ethyl isopentyl cyclohexane-1,2-dicarboxylate, n-propyl isopentyl cyclohexane-1,2-dicarboxylate, isopropyl isopentyl cyclohexane-1,2-dicarboxylate, n-butyl isopentyl cyclohexane-1,2-dicarboxylate, tert-butyl isopentyl cyclohexane-1,2-dicarboxylate, isobutyl isopentyl cyclohexane-1,2-dicarboxylate, glycol isopentyl cyclohexane-1,2-dicarboxylate, n-hexyl isopentyl cyclohexane-1,2-dicarboxylate, isohexyl isopentyl cyclohexane-1,2-dicarboxylate, n-heptyl isopentyl cyclohexane-1,2-dicarboxylate, isoheptyl isopentyl cyclohexane-1,2-dicarboxylate, n-octyl isopentyl cyclohexane-1,2-dicarboxylate, isooctyl isopentyl cyclohexane-1,2-dicarboxylate, 2-ethylhexyl isopentyl cyclohexane-1,2-dicarboxylate, n-nonyl isopentyl cyclohexane-1,2-dicarboxylate, isononyl isopentyl cyclohexane-1,2-dicarboxylate, 2-propylheptyl isopentyl cyclohexane-1,2-dicarboxylate, n-decyl isopentyl cyclohexane-1,2-dicarboxylate, isodecyl isopentyl cyclohexane-1,2-dicarboxylate, n-undecyl isopentyl cyclohexane-1,2-dicarboxylate, isoundecyl isopentyl cyclohexane-1,2-dicarboxylate, n-dodecyl isopentyl cyclohexane-1,2-dicarboxylate, isododecyl isopentyl cyclohexane-1,2-dicarboxylate, n-tridecyl isopentyl cyclohexane-1,2-dicarboxylate, isotridecyl iso-pentyl cyclohexane-1,2-dicarboxylate, methyl n-pentyl cyclohexane-1,2-dicarboxylate, ethyl n-pentyl cyclohexane-1,2-dicarboxylate, n-propyl n-pentyl cyclohexane-1,2-dicarboxylate, isopropyl n-pentyl cyclohexane-1,2-dicarboxylate, n-butyl n-pentyl cyclohexane-1,2-dicarboxylate, tert-butyl n-pentyl cyclohexane-1,2-dicarboxylate, iso-butyl n-pentyl cyclohexane-1,2-dicarboxylate, glycol n-pentyl cyclohexane-1,2-dicarboxylate, n-hexyl n-pentyl cyclohexane-1,2-dicarboxylate, isohexyl n-pentyl cyclohexane-1,2-dicarboxylate, n-heptyl n-pentyl cyclohexane-1,2-dicarboxylate, iso-heptyl n-pentyl cyclohexane-1,2-dicarboxylate, n-octyl n-pentyl cyclohexane-1,2-dicarboxylate, isooctyl n-pentyl cyclohexane-1,2-dicarboxylate, 2-ethylhexyl n-pentyl cyclohexane-1,2-dicarboxylate, n-nonyl n-pentyl cyclohexane-1,2-dicarboxylate, isononyl n-pentyl cyclohexane-1,2-dicarboxylate, 2-propylheptyl n-pentyl cyclohexane-1,2-dicarboxylate, n-decyl n-pentyl cyclohexane-1,2-dicarboxylate, isodecyl n-pentyl cyclohexane-1,2-dicarboxylate, n-undecyl n-pentyl cyclohexane-1,2-dicarboxylate, isoundecyl n-pentyl cyclohexane-1,2-dicarboxylate, n-dodecyl n-pentyl cyclohexane-1,2-dicarboxylate, isododecyl n-pentyl cyclohexane-1,2-dicarboxylate, n-tridecyl n-pentyl cyclohexane-1,2-dicarboxylate and isotridecyl n-pentyl cyclohexane-1,2-dicarboxylate;

mixed esters of cyclohexane-1,3-dicarboxylic acid with C1 to C13 alcohols, such as, for example, ethyl methyl cyclohexane-1,3-dicarboxylate, n-propyl methyl cyclohexane-1,3-dicarboxylate, isopropyl methyl cyclohexane-1,3-dicarboxylate, n-butyl methyl cyclohexane-1,3-dicarboxylate, tert-butyl methyl cyclohexane-1,3-dicarboxylate, iso-butyl methyl cyclohexane-1,3-dicarboxylate, glycol methyl cyclohexane-1,3-dicarboxylate, n-hexyl methyl cyclohexane-1,3-dicarboxylate, isohexyl methyl cyclohexane-1,3-dicarboxylate, n-heptyl methyl cyclohexane-1,3-dicarboxylate, iso-heptyl methyl cyclohexane-1,3-dicarboxylate, n-octyl methyl cyclohexane-1,3-dicarboxylate, isooctyl methyl cyclohexane-1,3-dicarboxylate, 2-ethylhexyl methyl cyclohexane-1,3-dicarboxylate, n-nonyl methyl cyclohexane-1,3-dicarboxylate, isononyl methyl cyclohexane-1,3-dicarboxylate, 2-propylheptyl methyl cyclohexane-1,3-dicarboxylate, n-decyl methyl cyclohexane-1,3- dicarboxylate, isodecyl methyl cyclohexane-1,3-dicarboxylate, n-undecyl methyl cyclohexane-1,3-dicarboxylate, iso-undecyl methyl cyclohexane-1,3-dicarboxylate, n-dodecyl methyl cyclohexane-1,3-dicarboxylate, isododecyl methyl cyclohexane-1,3-dicarboxylate, n-tridecyl methyl cyclohexane-1,3-dicarboxylate, isotridecyl methyl cyclohexane-1,3-dicarboxylate, n-propyl ethyl cyclohexane-1,3-dicarboxylate, isopropyl ethyl cyclohexane-1,3-dicarboxylate, n-butyl ethyl cyclohexane-1,3-dicarboxylate, tert-butyl ethyl cyclohexane-1,3-dicarboxylate, isobutyl ethyl cyclohexane-1,3-dicarboxylate, glycol ethyl cyclohexane-1,3-dicarboxylate, n-hexyl ethyl cyclohexane-1,3-dicarboxylate, isohexyl ethyl cyclohexane-1,3-dicarboxylate, n-heptyl ethyl cyclohexane-1,3-dicarboxylate, iso-heptyl ethyl cyclohexane-1,3-dicarboxylate, n-octyl ethyl cyclohexane-1,3-dicarboxylate, isooctyl ethyl cyclohexane-1,3-dicarboxylate, 2-ethylhexyl ethyl cyclohexane-1,3-dicarboxylate, n-nonyl ethyl cyclohexane-1,3-dicarboxylate, isononyl ethyl cyclohexane-1,3-dicarboxylate, 2-propylheptyl ethyl cyclohexane-1,3-dicarboxylate, n-decyl ethyl cyclohexane-1,3-dicarboxylate, isodecyl ethyl cyclohexane-1,3-dicarboxylate, n-undecyl ethyl cyclohexane-1,3-dicarboxylate, isoundecyl ethyl cyclohexane-1,3-dicarboxylate, n-dodecyl ethyl cyclohexane-1,3-dicarboxylate, isododecyl ethyl cyclohexane-1,3-dicarboxylate, n-tridecyl ethyl cyclohexane-1,3-dicarboxylate, isotridecyl ethyl cyclohexane-1,3-dicarboxylate, isopropyl n-propyl cyclohexane-1,3-dicarboxylate, n-butyl n-propyl cyclohexane-1,3-dicarboxylate, tert-butyl n-propyl cyclohexane-1,3-dicarboxylate, isobutyl n-propyl cyclohexane-1,3-dicarboxylate, glycol n-propyl cyclohexane-1,3-dicarboxylate, n-hexyl n-propyl cyclohexane-1,3-dicarboxylate, isohexyl n-propyl cyclohexane-1,3-dicarboxylate, n-heptyl n-propyl cyclohexane-1,3-dicarboxylate, isoheptyl n-propyl cyclohexane-1,3-dicarboxylate, n-octyl n-propyl cyclohexane-1,3-dicarboxylate, isooctyl n-propyl cyclohexane-1,3-dicarboxylate, 2-ethylhexyl n-propyl cyclohexane-1,3-dicarboxylate, n-nonyl n-propyl cyclohexane-1,3-dicarboxylate, isononyl n-propyl cyclohexane-1,3-dicarboxylate, 2-propylheptyl n-propyl cyclohexane-1,3-dicarboxylate, n-decyl n-propyl cyclohexane-1,3-dicarboxylate, isodecyl n-propyl cyclohexane-1,3-dicarboxylate, n-undecyl n-propyl cyclohexane-1,3-dicarboxylate, isoundecyl n-propyl cyclohexane-1,3-dicarboxylate, n-dodecyl n-propyl cyclohexane-1,3-dicarboxylate, isododecyl n-propyl cyclohexane-1,3-dicarboxylate, n-tridecyl n-propyl cyclohexane-1,3-dicarboxylate, isotridecyl n-propyl cyclohexane-1,3-dicarboxylate, n-butyl isopropyl cyclohexane-1,3-dicarboxylate, tert-butyl isopropyl cyclohexane-1,3-dicarboxylate, iso butyl isopropyl cyclohexane-1,3-dicarboxylate, glycol isopropyl cyclohexane-1,3-dicarboxylate, n-hexyl isopropyl cyclohexane-1,3-dicarboxylate, isohexyl isopropyl cyclohexane-1,3-dicarboxylate, n-heptyl isopropyl cyclohexane-1,3-dicarboxylate, isoheptyl isopropyl cyclohexane-1,3-dicarboxylate, n-octyl isopropyl cyclohexane-1,3-dicarboxylate, isooctyl isopropyl cyclohexane-1,3-dicarboxylate, 2-ethylhexyl isopropyl cyclohexane-1,3-dicarboxylate, n-nonyl iso-propyl cyclohexane-1,3-dicarboxylate, isononyl isopropyl cyclohexane-1,3-dicarboxylate, 2-propylheptyl isopropyl cyclohexane-1,3-dicarboxylate, n-decyl iso-propyl cyclohexane-1,3-dicarboxylate, isodecyl isopropyl cyclohexane-1,3-dicarboxylate, n-undecyl isopropyl cyclohexane-1,3-dicarboxylate, isoundecyl iso-propyl cyclohexane-1,3-dicarboxylate, n-dodecyl isopropyl cyclohexane-1,3-dicarboxylate, isododecyl isopropyl cyclohexane-1,3-dicarboxylate, n-tridecyl iso-propyl cyclohexane-1,3-dicarboxylate, isotridecyl isopropyl cyclohexane-1,3-dicarboxylate, tert-butyl n-butyl cyclohexane-1,3-dicarboxylate, isobutyl n-butyl cyclohexane-1,3-dicarboxylate, glycol n-butyl cyclohexane-1,3-dicarboxylate, n-hexyl n-butyl cyclohexane-1,3-dicarboxylate, isohexyl n-butyl cyclohexane-1,3-dicarboxylate, n-heptyl n-butyl cyclohexane-1,3-dicarboxylate, isoheptyl n-butyl cyclohexane-1,3-dicarboxylate, n-octyl n-butyl cyclohexane-1,3-dicarboxylate, isooctyl n-butyl cyclohexane-1,3-dicarboxylate, 2-ethylhexyl n-butyl cyclohexane-1,3-dicarboxylate, n-nonyl n-butyl cyclohexane-1,3-dicarboxylate, isononyl n-butyl cyclohexane-1,3-dicarboxylate, 2-propylheptyl n-butyl cyclohexane-1,3-dicarboxylate, n-decyl n-butyl cyclohexane-1,3-dicarboxylate, isodecyl n-butyl cyclohexane-1,3-dicarboxylate, n-undecyl n-butyl cyclohexane-1,3-dicarboxylate, isoundecyl n-butyl cyclohexane-1,3-dicarboxylate, n-dodecyl n-butyl cyclohexane-1,3-dicarboxylate, isododecyl n-butyl cyclohexane-1,3-dicarboxylate, n-tridecyl n-butyl cyclohexane-1,3-dicarboxylate, isotridecyl n-butyl cyclohexane-1,3-dicarboxylate, isobutyl tert-butyl cyclohexane-1,3-dicarboxylate, glycol tert-butyl cyclohexane-1,3-dicarboxylate, n-hexyl tert-butyl cyclohexane-1,3-dicarboxylate, isohexyl tert-butyl cyclohexane-1,3-dicarboxylate, n-heptyl tert-butyl cyclohexane-1,3-dicarboxylate, isoheptyl tert-butyl cyclohexane-1,3-dicarboxylate, n-octyl tert-butyl cyclohexane-1,3-dicarboxylate, isooctyl tert-butyl cyclohexane-1,3-dicarboxylate, 2-ethylhexyl tert-butyl cyclohexane-1,3-dicarboxylate, n-nonyl tart-butyl cyclohexane-1,3-dicarboxylate, isononyl tert-butyl cyclohexane-1,3-dicarboxylate, 2-propylheptyl tert-butyl cyclohexane-1,3-dicarboxylate, n-decyl tert-butyl cyclohexane-1,3-dicarboxylate, isodecyl tert-butyl cyclohexane-1,3-dicarboxylate, n-undecyl tart-butyl cyclohexane-1,3-dicarboxylate, isoundecyl tert-butyl cyclohexane-1,3-dicarboxylate, n-dodecyl tert-butyl cyclohexane-1,3-dicarboxylate, isododecyl tert-butyl cyclohexane-1,3-dicarboxylate, n-tridecyl tert-butyl cyclohexane-1,3-dicarboxylate, isotridecyl tert-butyl cyclohexane-1,3-dicarboxylate, glycol isobutyl cyclohexane-1,3-dicarboxylate, n-hexyl isobutyl cyclohexane-1,3-dicarboxylate, iso-hexyl isobutyl cyclohexane-1,3-dicarboxylate, n-heptyl isobutyl cyclohexane-1,3-dicarboxylate, isoheptyl isobutyl cyclohexane-1,3-dicarboxylate, n-octyl isobutyl cyclohexane-1,3-dicarboxylate, isooctyl isobutyl cyclohexane-1,3-dicarboxylate, 2-ethylhexyl isobutyl cyclohexane-1,3-dicarboxylate, n-nonyl isobutyl cyclohexane-1,3-dicarboxylate, isononyl isobutyl cyclohexane-1,3-dicarboxylate, 2-propylheptyl iso-butyl cyclohexane-1,3-dicarboxylate, n-decyl isobutyl cyclohexane-1,3-dicarboxylate, isodecyl isobutyl cyclohexane-1,3-dicarboxylate, n-undecyl isobutyl cyclohexane-1,3-dicarboxylate, isoundecyl isobutyl cyclohexane-1,3-dicarboxylate, n-dodecyl iso-butyl cyclohexane-1,3-dicarboxylate, isododecyl isobutyl cyclohexane-1,3- dicarboxylate, n-tridecyl isobutyl cyclohexane-1,3-dicarboxylate, isotridecyl isobutyl cyclohexane-1,3-dicarboxylate, n-hexyl glycol cyclohexane-1,3-dicarboxylate, isohexyl glycol cyclohexane-1,3-dicarboxylate, n-heptyl glycol cyclohexane-1,3-dicarboxylate, isoheptyl glycol cyclohexane-1,3-dicarboxylate, n-octyl glycol cyclohexane-1,3-dicarboxylate, isooctyl glycol cyclohexane-1,3-dicarboxylate, 2-ethylhexyl glycol cyclohexane-1,3-dicarboxylate, n-nonyl glycol cyclohexane-1,3-dicarboxylate, isononyl glycol cyclohexane-1,3-dicarboxylate, 2-propylheptyl glycol cyclohexane-1,3-dicarboxylate, n-decyl glycol cyclohexane-1,3-dicarboxylate, isodecyl glycol cyclohexane-1,3-dicarboxylate, n-undecyl glycol cyclohexane-1,3-dicarboxylate, isoundecyl glycol cyclohexane-1,3-dicarboxylate, n-dodecyl glycol cyclohexane-1,3-dicarboxylate, isododecyl glycol cyclohexane-1,3-dicarboxylate, n-tridecyl glycol cyclohexane-1,3-dicarboxylate, isotridecyl glycol cyclohexane-1,3-dicarboxylate, isohexyl n-hexyl cyclohexane-1,3-dicarboxylate, n-heptyl n-hexyl cyclohexane-1,3-dicarboxylate, iso-heptyl n-hexyl cyclohexane-1,3-dicarboxylate, n-octyl n-hexyl cyclohexane-1,3-dicarboxylate, isooctyl n-hexyl cyclohexane-1,3-dicarboxylate, 2-ethylhexyl n-hexyl cyclohexane-1,3-dicarboxylate, n-nonyl n-hexyl cyclohexane-1,3-dicarboxylate, iso-nonyl n-hexyl cyclohexane-1,3-dicarboxylate, 2-propylheptyl n-hexyl cyclohexane-1,3-dicarboxylate, n-decyl n-hexyl cyclohexane-1,3-dicarboxylate, isodecyl n-hexyl cyclohexane-1,3-dicarboxylate, n-undecyl n-hexyl cyclohexane-1,3-dicarboxylate, iso-undecyl n-hexyl cyclohexane-1,3-dicarboxylate, n-dodecyl n-hexyl cyclohexane-1,3-dicarboxylate, isododecyl n-hexyl cyclohexane-1,3-dicarboxylate, n-tridecyl n-hexyl cyclohexane-1,3-dicarboxylate, isotridecyl n-hexyl cyclohexane-1,3-dicarboxylate, n-heptyl isohexyl cyclohexane-1,3-dicarboxylate, isoheptyl isohexyl cyclohexane-1,3-dicarboxylate, n-octyl isohexyl cyclohexane-1,3-dicarboxylate, isooctyl isohexyl cyclohexane-1,3-dicarboxylate, 2-ethylhexyl isohexyl cyclohexane-1,3-dicarboxylate, n-nonyl isohexyl cyclohexane-1,3-dicarboxylate, isononyl isohexyl cyclohexane-1,3-dicarboxylate, 2-propylheptyl isohexyl cyclohexane-1,3-dicarboxylate, n-decyl iso-hexyl cyclohexane-1,3-dicarboxylate, isodecyl isohexyl cyclohexane-1,3-dicarboxylate, n-undecyl isohexyl cyclohexane-1,3-dicarboxylate, isoundecyl isohexyl cyclohexane-1,3-dicarboxylate, n-dodecyl isohexyl cyclohexane-1,3-dicarboxylate, isododecyl iso-hexyl cyclohexane-1,3-dicarboxylate, n-tridecyl isohexyl cyclohexane-1,3-dicarboxylate, isotridecyl isohexyl cyclohexane-1,3-dicarboxylate, isoheptyl n-heptyl cyclohexane-1,3-dicarboxylate, n-octyl n-heptyl cyclohexane-1,3-dicarboxylate, isooctyl n-heptyl cyclohexane-1,3-dicarboxylate, 2-ethylhexyl n-heptyl cyclohexane-1,3-dicarboxylate, n-nonyl n-heptyl cyclohexane-1,3-dicarboxylate, isononyl n-heptyl cyclohexane-1,3-dicarboxylate, 2-propylheptyl n-heptyl cyclohexane-1,3-dicarboxylate, n-decyl n-heptyl cyclohexane-1,3-dicarboxylate, isodecyl n-heptyl cyclohexane-1,3-dicarboxylate, n-undecyl n-heptyl cyclohexane-1,3-dicarboxylate, isoundecyl n-heptyl cyclohexane-1,3-dicarboxylate, n-dodecyl n-heptyl cyclohexane-1,3-dicarboxylate, isododecyl n-heptyl cyclohexane-1,3-dicarboxylate, n-tridecyl n-heptyl cyclohexane-1,3-dicarboxylate, isotridecyl n-heptyl cyclohexane-1,3-dicarboxylate, n-octyl isoheptyl cyclohexane-1,3-dicarboxylate, isooctyl isoheptyl cyclohexane-1,3-dicarboxylate, 2-ethylhexyl isoheptyl cyclohexane-1,3-dicarboxylate, n-nonyl isoheptyl cyclohexane-1,3-dicarboxylate, isononyl isoheptyl cyclohexane-1,3-dicarboxylate, 2-propylheptyl isoheptyl cyclohexane-1,3-dicarboxylate, n-decyl iso-heptyl cyclohexane-1,3-dicarboxylate, isodecyl isoheptyl cyclohexane-1,3-dicarboxylate, n-undecyl isoheptyl cyclohexane-1,3-dicarboxylate, isoundecyl iso-heptyl cyclohexane-1,3-dicarboxylate, n-dodecyl isoheptyl cyclohexane-1,3-dicarboxylate, isododecyl isoheptyl cyclohexane-1,3-dicarboxylate, n-tridecyl iso-heptyl cyclohexane-1,3-dicarboxylate, isotridecyl isoheptyl cyclohexane-1,3-dicarboxylate, isooctyl n-octyl cyclohexane-1,3-dicarboxylate, 2-ethylhexyl n-octyl cyclohexane-1,3-dicarboxylate, n-nonyl n-octyl cyclohexane-1,3-dicarboxylate, isononyl n-octyl cyclohexane-1,3-dicarboxylate, 2-propylheptyl n-octyl cyclohexane-1,3-dicarboxylate, n-decyl n-octyl cyclohexane-1,3-dicarboxylate, isodecyl n-octyl cyclohexane-1,3-dicarboxylate, n-undecyl n-octyl cyclohexane-1,3-dicarboxylate, iso-undecyl n-octyl cyclohexane-1,3-dicarboxylate, n-dodecyl n-octyl cyclohexane-1,3-dicarboxylate, isododecyl n-octyl cyclohexane-1,3-dicarboxylate, n-tridecyl n-octyl cyclohexane-1,3-dicarboxylate, isotridecyl n-octyl cyclohexane-1,3-dicarboxylate, 2-ethylhexyl isooctyl cyclohexane-1,3-dicarboxylate, n-nonyl isooctyl cyclohexane-1,3-dicarboxylate, isononyl isooctyl cyclohexane-1,3-dicarboxylate, 2-propylheptyl iso-octyl cyclohexane-1,3-dicarboxylate, n-decyl isooctyl cyclohexane-1,3-dicarboxylate, isodecyl isooctyl cyclohexane-1,3-dicarboxylate, n-undecyl isooctyl cyclohexane-1,3-dicarboxylate, isoundecyl isooctyl cyclohexane-1,3-dicarboxylate, n-dodecyl iso-octyl cyclohexane-1,3-dicarboxylate, isododecyl isooctyl cyclohexane-1,3-dicarboxylate, n-tridecyl isooctyl cyclohexane-1,3-dicarboxylate, isotridecyl isooctyl cyclohexane-1,3-dicarboxylate, n-nonyl 2-ethylhexyl cyclohexane-1,3-dicarboxylate, isononyl 2-ethylhexyl cyclohexane-1,3-dicarboxylate, 2-propylheptyl 2-ethylhexyl cyclohexane-1,3-dicarboxylate, n-decyl 2-ethylhexyl cyclohexane-1,3-dicarboxylate, isodecyl 2-ethylhexyl cyclohexane-1,3-dicarboxylate, n-undecyl 2-ethyl hexyl cyclohexane-1,3-dicarboxylate, isoundecyl 2-ethylhexyl cyclohexane-1,3-dicarboxylate, n-dodecyl 2-ethylhexyl cyclohexane-1,3-dicarboxylate, isododecyl 2-ethylhexyl cyclohexane-1,3-dicarboxylate, n-tridecyl 2-ethylhexyl cyclohexane-1,3-dicarboxylate, isotridecyl 2-ethylhexyl cyclohexane-1,3-dicarboxylate, isononyl n-nonyl cyclohexane-1,3-dicarboxylate, 2-propylheptyl n-nonyl cyclohexane-1,3-dicarboxylate, n-decyl n-nonyl cyclohexane-1,3-dicarboxylate, isodecyl n-nonyl cyclohexane-1,3-dicarboxylate, n-undecyl n-nonyl cyclohexane-1,3-dicarboxylate, isoundecyl n-nonyl cyclohexane-1,3-dicarboxylate, n-dodecyl n-nonyl cyclohexane-1,3-dicarboxylate, isododecyl n-nonyl cyclohexane-1,3-dicarboxylate, n-tridecyl n-nonyl cyclohexane-1,3-dicarboxylate, isotridecyl n-nonyl cyclohexane-1,3-dicarboxylate, 2-propylheptyl isononyl cyclohexane-1,3-dicarboxylate, n-decyl isononyl cyclohexane-1,3-dicarboxylate, isodecyl isononyl cyclohexane-1,3-dicarboxylate, n-undecyl isononyl cyclohexane-1,3-dicarboxylate, isoundecyl isononyl cyclohexane-1,3-dicarboxylate, n-dodecyl isononyl cyclohexane-1,3-dicarboxylate, isododecyl isononyl cyclohexane-1,3-dicarboxylate, n-tridecyl isononyl cyclohexane-1,3- dicarboxylate, isotridecyl iso-nonyl cyclohexane-1,3-dicarboxylate, n-decyl 2-propylheptyl cyclohexane-1,3-dicarboxylate, isodecyl 2-propylheptyl cyclohexane-1,3-dicarboxylate, n-undecyl 2-propylheptyl cyclohexane-1,3-dicarboxylate, isoundecyl 2-propylheptyl cyclohexane-1,3-dicarboxylate, n-dodecyl 2-propylheptyl cyclohexane-1,3-dicarboxylate, isododecyl 2-propylheptyl cyclohexane-1,3-dicarboxylate, n-tridecyl 2-propylheptyl cyclohexane-1,3-dicarboxylate, isotridecyl 2-propylheptyl cyclohexane-1,3-dicarboxylate, isodecyl n-decyl cyclohexane-1,3-dicarboxylate, n-undecyl n-decyl cyclohexane-1,3-dicarboxylate, isoundecyl n-decyl cyclohexane-1,3-dicarboxylate, n-dodecyl n-decyl cyclohexane-1,3-dicarboxylate, isododecyl n-decyl cyclohexane-1,3-dicarboxylate, n-tridecyl n-decyl cyclohexane-1,3-dicarboxylate, isotridecyl n-decyl cyclohexane-1,3-dicarboxylate, n-undecyl isodecyl cyclohexane-1,3-dicarboxylate, isoundecyl iso-decyl cyclohexane-1,3-dicarboxylate, n-dodecyl isodecyl cyclohexane-1,3-dicarboxylate, isododecyl isodecyl cyclohexane-1,3-dicarboxylate, n-tridecyl iso-decyl cyclohexane-1,3-dicarboxylate, isotridecyl isodecyl cyclohexane-1,3-dicarboxylate, isoundecyl n-undecyl cyclohexane-1,3-dicarboxylate, n-dodecyl n-undecyl cyclohexane-1,3-dicarboxylate, isododecyl n-undecyl cyclohexane-1,3-dicarboxylate, n-tridecyl n-undecyl cyclohexane-1,3-dicarboxylate, isotridecyl n-undecyl cyclohexane-1,3-dicarboxylate, n-dodecyl isoundecyl cyclohexane-1,3-dicarboxylate, isododecyl isoundecyl cyclohexane-1,3-dicarboxylate, n-tridecyl iso-undecyl cyclohexane-1,3-dicarboxylate, isotridecyl isoundecyl cyclohexane-1,3-dicarboxylate, isododecyl n-dodecyl cyclohexane-1,3-dicarboxylate, n-tridecyl n-dodecyl cyclohexane-1,3-dicarboxylate, isotridecyl n-dodecyl cyclohexane-1,3-dicarboxylate, n-tridecyl isododecyl cyclohexane-1,3-dicarboxylate, isotridecyl iso-dodecyl cyclohexane-1,3-dicarboxylate, isotridecyl n-tridecyl cyclohexane-1,3-dicarboxylate, methyl cyclohexyl cyclohexane-1,3-dicarboxylate, ethyl cyclohexyl cyclohexane-1,3-dicarboxylate, n-propyl cyclohexyl cyclohexane-1,3-dicarboxylate, isopropyl cyclohexyl cyclohexane-1,3-dicarboxylate, n-butyl cyclohexyl cyclohexane-1,3-dicarboxylate, tert-butyl cyclohexyl cyclohexane-1,3-dicarboxylate, isobutyl cyclohexyl cyclohexane-1,3-dicarboxylate, glycol cyclohexyl cyclohexane-1,3-dicarboxylate, n-hexyl cyclohexyl cyclohexane-1,3-dicarboxylate, isohexyl cyclohexyl cyclohexane 1,3-dicarboxylate, n-heptyl cyclohexyl cyclohexane-1,3-dicarboxylate, isoheptyl cyclohexyl cyclohexane-1,3-dicarboxylate, n-octyl cyclohexyl cyclohexane-1,3-dicarboxylate, isooctyl cyclohexyl cyclohexane-1,3-dicarboxylate, 2-ethylhexyl cyclohexyl cyclohexane-1,3-dicarboxylate, n-nonyl cyclohexyl cyclohexane-1,3-dicarboxylate, isononyl cyclohexyl cyclohexane-1,3-dicarboxylate, 2-propylheptyl cyclohexyl cyclohexane-1,3-dicarboxylate, n-decyl cyclohexyl cyclohexane-1,3-dicarboxylate, isodecyl cyclohexyl cyclohexane-1,3-dicarboxylate, n-undecyl cyclohexyl cyclohexane-1,3-dicarboxylate, isoundecyl cyclohexyl cyclohexane-1,3-dicarboxylate, n-dodecyl cyclohexyl cyclohexane-1,3-dicarboxylate, isododecyl cyclohexyl cyclohexane-1,3-dicarboxylate, n-tridecyl cyclohexyl cyclohexane-1,3-dicarboxylate, isotridecyl cyclohexyl cyclohexane-1,3-dicarboxylate, methyl isopentyl cyclohexane-1,3-dicarboxylate, ethyl isopentyl cyclohexane-1,3-dicarboxylate, n-propyl isopentyl cyclohexane-1,3-dicarboxylate, isopropyl isopentyl cyclohexane-1,3-dicarboxylate, n-butyl isopentyl cyclohexane-1,3-dicarboxylate, tert-butyl isopentyl cyclohexane-1,3-dicarboxylate, isobutyl isopentyl cyclohexane-1,3-dicarboxylate, glycol isopentyl cyclohexane-1,3-dicarboxylate, n-hexyl isopentyl cyclohexane-1,3-dicarboxylate, isohexyl isopentyl cyclohexane-1,3-dicarboxylate, n-heptyl isopentyl cyclohexane-1,3-dicarboxylate, isoheptyl isopentyl cyclohexane-1,3-dicarboxylate, n-octyl isopentyl cyclohexane-1,3-dicarboxylate, isooctyl isopentyl cyclohexane-1,3-dicarboxylate, 2-ethylhexyl isopentyl cyclohexane-1,3-dicarboxylate, n-nonyl isopentyl cyclohexane-1,3-dicarboxylate, isononyl isopentyl cyclohexane-1,3-dicarboxylate, 2-propylheptyl isopentyl cyclohexane-1,3-dicarboxylate, n-decyl isopentyl cyclohexane-1,3-dicarboxylate, isodecyl isopentyl cyclohexane-1,3-dicarboxylate, n-undecyl isopentyl cyclohexane-1,3-dicarboxylate, isoundecyl isopentyl cyclohexane-1,3-dicarboxylate, n-dodecyl isopentyl cyclohexane-1,3-dicarboxylate, isododecyl isopentyl cyclohexane-1,3-dicarboxylate, n-tridecyl isopentyl cyclohexane-1,3-dicarboxylate, isotridecyl iso-pentyl cyclohexane-1,3-dicarboxylate, methyl n-pentyl cyclohexane-1,3-dicarboxylate, ethyl n-pentyl cyclohexane-1,3-dicarboxylate, n-propyl n-pentyl cyclohexane-1,3-dicarboxylate, isopropyl n-pentyl cyclohexane-1,3-dicarboxylate, n-butyl n-pentyl cyclohexane-1,3-dicarboxylate, tert-butyl n-pentyl cyclohexane-1,3-dicarboxylate, iso-butyl n-pentyl cyclohexane-1,3-dicarboxylate, glycol n-pentyl cyclohexane-1,3-dicarboxylate, n-hexyl n-pentyl cyclohexane-1,3-dicarboxylate, isohexyl n-pentyl cyclohexane-1,3-dicarboxylate, n-heptyl n-pentyl cyclohexane-1,3-dicarboxylate, iso-heptyl n-pentyl cyclohexane-1,3-dicarboxylate, n-octyl n-pentyl cyclohexane-1,3-dicarboxylate, isooctyl n-pentyl cyclohexane-1,3-dicarboxylate, 2-ethylhexyl n-pentyl cyclohexane-1,3-dicarboxylate, n-nonyl n-pentyl cyclohexane-1,3-dicarboxylate, isononyl n-pentyl cyclohexane-1,3-dicarboxylate, 2-propylheptyl n-pentyl cyclohexane-1,3-dicarboxylate, n-decyl n-pentyl cyclohexane-1,3-dicarboxylate, isodecyl n-pentyl cyclohexane-1,3-dicarboxylate, n-undecyl n-pentyl cyclohexane-1,3-dicarboxylate, isoundecyl n-pentyl cyclohexane-1,3-dicarboxylate, n-dodecyl n-pentyl cyclohexane-1,3-dicarboxylate, isododecyl n-pentyl cyclohexane-1,3-dicarboxylate, n-tridecyl n-pentyl cyclohexane-1,3-dicarboxylate and isotridecyl n-pentyl cyclohexane-1,3-dicarboxylate;

mixed esters of cyclohexane-1,4-dicarboxylic acid with C1 to C13 alcohols, such as, for example, ethyl methyl cyclohexane-1,4-dicarboxylate, n-propyl methyl cyclohexane-1,4-dicarboxylate, isopropyl methyl cyclohexane-1,4-dicarboxylate, n-butyl methyl cyclohexane-1,4-dicarboxylate, tert-butyl methyl cyclohexane-1,4-dicarboxylate, iso-butyl methyl cyclohexane-1,4-dicarboxylate, glycol methyl cyclohexane-1,4-dicarboxylate, n-hexyl methyl cyclohexane-1,4-dicarboxylate, isohexyl methyl cyclohexane-1,4-dicarboxylate, n-heptyl methyl cyclohexane-1,4-dicarboxylate, iso-heptyl methyl cyclohexane-1,4-dicarboxylate, n-octyl methyl cyclohexane-1,4-dicarboxylate, isooctyl methyl cyclohexane-1,4-dicarboxylate, 2-ethylhexyl methyl cyclohexane-1,4-dicarboxylate, n-nonyl methyl cyclohexane-1,4-dicarboxylate, isononyl methyl cyclohexane-1,4-dicarboxylate, 2-propylheptyl methyl cyclohexane-1,4-dicarboxylate, n-decyl methyl cyclohexane-1,4- dicarboxylate, isodecyl methyl cyclohexane-1,4-dicarboxylate, n-undecyl methyl cyclohexane-1,4-dicarboxylate, iso-undecyl methyl cyclohexane-1,4-dicarboxylate, n-dodecyl methyl cyclohexane-1,4-dicarboxylate, isododecyl methyl cyclohexane-1,4-dicarboxylate, n-tridecyl methyl cyclohexane-1,4-dicarboxylate, isotridecyl methyl cyclohexane-1,4-dicarboxylate, n-propyl ethyl cyclohexane-1,4-dicarboxylate, isopropyl ethyl cyclohexane-1,4-dicarboxylate, n-butyl ethyl cyclohexane-1,4-dicarboxylate, tert-butyl ethyl cyclohexane-1,4-dicarboxylate, isobutyl ethyl cyclohexane-1,4-dicarboxylate, glycol ethyl cyclohexane-1,4-dicarboxylate, n-hexyl ethyl cyclohexane-1,4-dicarboxylate, isohexyl ethyl cyclohexane-1,4-dicarboxylate, n-heptyl ethyl cyclohexane-1,4-dicarboxylate, iso-heptyl ethyl cyclohexane-1,4-dicarboxylate, n-octyl ethyl cyclohexane-1,4-dicarboxylate, isooctyl ethyl cyclohexane-1,4-dicarboxylate, 2-ethylhexyl ethyl cyclohexane-1,4-dicarboxylate, n-nonyl ethyl cyclohexane-1,4-dicarboxylate, isononyl ethyl cyclohexane-1,4-dicarboxylate, 2-propylheptyl ethyl cyclohexane-1,4-dicarboxylate, n-decyl ethyl cyclohexane-1,4-dicarboxylate, isodecyl ethyl cyclohexane-1,4-dicarboxylate, n-undecyl ethyl cyclohexane-1,4-dicarboxylate, isoundecyl ethyl cyclohexane-1,4-dicarboxylate, n-dodecyl ethyl cyclohexane-1,4-dicarboxylate, isododecyl ethyl cyclohexane-1,4-dicarboxylate, n-tridecyl ethyl cyclohexane-1,4-dicarboxylate, isotridecyl ethyl cyclohexane-1,4-dicarboxylate, isopropyl n-propyl cyclohexane-1,4-dicarboxylate, n-butyl n-propyl cyclohexane-1,4-dicarboxylate, tert-butyl n-propyl cyclohexane-1,4-dicarboxylate, isobutyl n-propyl cyclohexane-1,4-dicarboxylate, glycol n-propyl cyclohexane-1,4-dicarboxylate, n-hexyl n-propyl cyclohexane-1,4-dicarboxylate, isohexyl n-propyl cyclohexane-1,4-dicarboxylate, n-heptyl n-propyl cyclohexane-1,4-dicarboxylate, isoheptyl n-propyl cyclohexane-1,4-dicarboxylate, n-octyl n-propyl cyclohexane-1,4-dicarboxylate, isooctyl n-propyl cyclohexane-1,4-dicarboxylate, 2-ethylhexyl n-propyl cyclohexane-1,4-dicarboxylate, n-nonyl n-propyl cyclohexane-1,4-dicarboxylate, isononyl n-propyl cyclohexane-1,4-dicarboxylate, 2-propylheptyl n-propyl cyclohexane-1,4-dicarboxylate, n-decyl n-propyl cyclohexane-1,4-dicarboxylate, isodecyl n-propyl cyclohexane-1,4-dicarboxylate, n-undecyl n-propyl cyclohexane-1,4-dicarboxylate, isoundecyl n-propyl cyclohexane-1,4-dicarboxylate, n-dodecyl n-propyl cyclohexane-1,4-dicarboxylate, isododecyl n-propyl cyclohexane-1,4-dicarboxylate, n-tridecyl n-propyl cyclohexane-1,4-dicarboxylate, isotridecyl n-propyl cyclohexane-1,4-dicarboxylate, n-butyl isopropyl cyclohexane-1,4-dicarboxylate, tert-butyl isopropyl cyclohexane-1,4-dicarboxylate, isobutyl isopropyl cyclohexane-1,4-dicarboxylate, glycol isopropyl cyclohexane-1,4-dicarboxylate, n-hexyl isopropyl cyclohexane-1,4-dicarboxylate, isohexyl isopropyl cyclohexane-1,4-dicarboxylate, n-heptyl isopropyl cyclohexane-1,4-dicarboxylate, isoheptyl isopropyl cyclohexane-1,4-dicarboxylate, n-octyl isopropyl cyclohexane-1,4-dicarboxylate, isooctyl isopropyl cyclohexane-1,4-dicarboxylate, 2-ethylhexyl isopropyl cyclohexane-1,4-dicarboxylate, n-nonyl iso-propyl cyclohexane-1,4-dicarboxylate, isononyl isopropyl cyclohexane-1,4-dicarboxylate, 2-propylheptyl isopropyl cyclohexane-1,4-dicarboxylate, n-decyl iso-propyl cyclohexane-1,4-dicarboxylate, isodecyl isopropyl cyclohexane-1,4-dicarboxylate, n-undecyl isopropyl cyclohexane-1,4-dicarboxylate, isoundecyl iso-propyl cyclohexane-1,4-dicarboxylate, n-dodecyl isopropyl cyclohexane-1,4-dicarboxylate, isododecyl isopropyl cyclohexane-1,4-dicarboxylate, n-tridecyl iso-propyl cyclohexane-1,4-dicarboxylate, isotridecyl isopropyl cyclohexane-1,4-dicarboxylate, tert-butyl n-butyl cyclohexane-1,4-dicarboxylate, isobutyl n-butyl cyclohexane-1,4-dicarboxylate, glycol n-butyl cyclohexane-1,4-dicarboxylate, n-hexyl n-butyl cyclohexane-1,4-dicarboxylate, isohexyl n-butyl cyclohexane-1,4-dicarboxylate, n-heptyl n-butyl cyclohexane-1,4-dicarboxylate, isoheptyl n-butyl cyclohexane-1,4-dicarboxylate, n-octyl n-butyl cyclohexane-1,4-dicarboxylate, isooctyl n-butyl cyclohexane-1,4-dicarboxylate, 2-ethylhexyl n-butyl cyclohexane-1,4-dicarboxylate, n-nonyl n-butyl cyclohexane-1,4-dicarboxylate, isononyl n-butyl cyclohexane-1,4-dicarboxylate, 2-propylheptyl n-butyl cyclohexane-1,4-dicarboxylate, n-decyl n-butyl cyclohexane-1,4-dicarboxylate, isodecyl n-butyl cyclohexane-1,4-dicarboxylate, n-undecyl n-butyl cyclohexane-1,4-dicarboxylate, isoundecyl n-butyl cyclohexane-1,4-dicarboxylate, n-dodecyl n-butyl cyclohexane-1,4-dicarboxylate, isododecyl n-butyl cyclohexane-1,4-dicarboxylate, n-tridecyl n-butyl cyclohexane-1,4-dicarboxylate, iso-tridecyl n-butyl cyclohexane-1,4-dicarboxylate, isobutyl tert-butyl cyclohexane-1,4-dicarboxylate, glycol tert-butyl cyclohexane-1,4-dicarboxylate, n-hexyl tert-butyl cyclohexane-1,4-dicarboxylate, isohexyl tert-butyl cyclohexane-1,4-dicarboxylate, n-heptyl tert-butyl cyclohexane-1,4-dicarboxylate, isoheptyl tert-butyl cyclohexane-1,4-dicarboxylate, n-octyl tert-butyl cyclohexane-1,4-dicarboxylate, isooctyl tert-butyl cyclohexane-1,4-dicarboxylate, 2-ethylhexyl tert-butyl cyclohexane-1,4-dicarboxylate, n-nonyl tert-butyl cyclohexane-1,4-dicarboxylate, isononyl tert-butyl cyclohexane-1,4-dicarboxylate, 2-propylheptyl tert-butyl cyclohexane-1,4-dicarboxylate, n-decyl tert-butyl cyclohexane-1,4-dicarboxylate, isodecyl tert-butyl cyclohexane-1,4-dicarboxylate, n-undecyl tert-butyl cyclohexane-1,4-dicarboxylate, isoundecyl tert-butyl cyclohexane-1,4-dicarboxylate, n-dodecyl tert-butyl cyclohexane-1,4-dicarboxylate, isododecyl tert-butyl cyclohexane-1,4-dicarboxylate, n-tridecyl tert-butyl cyclohexane-1,4-dicarboxylate, isotridecyl tert-butyl cyclohexane-1,4-dicarboxylate, glycol isobutyl cyclohexane-1,4-dicarboxylate, n-hexyl isobutyl cyclohexane-1,4-dicarboxylate, iso-hexyl isobutyl cyclohexane-1,4-dicarboxylate, n-heptyl isobutyl cyclohexane-1,4-dicarboxylate, isoheptyl isobutyl cyclohexane-1,4-dicarboxylate, n-octyl isobutyl cyclohexane-1,4-dicarboxylate, isooctyl isobutyl cyclohexane-1,4-dicarboxylate, 2-ethylhexyl isobutyl cyclohexane-1,4-dicarboxylate, n-nonyl isobutyl cyclohexane-1,4-dicarboxylate, isononyl isobutyl cyclohexane-1,4-dicarboxylate, 2-propylheptyl iso-butyl cyclohexane-1,4-dicarboxylate, n-decyl isobutyl cyclohexane-1,4-dicarboxylate, isodecyl isobutyl cyclohexane-1,4-dicarboxylate, n-undecyl isobutyl cyclo hexane-1,4-dicarboxylate, isoundecyl isobutyl cyclohexane-1,4-dicarboxylate, n-dodecyl iso-butyl cyclohexane-1,4-dicarboxylate, isododecyl isobutyl cyclohexane-1,4- dicarboxylate, n-tridecyl isobutyl cyclohexane-1,4-dicarboxylate, isotridecyl isobutyl cyclohexane-1,4-dicarboxylate, n-hexyl glycol cyclohexane-1,4-dicarboxylate, isohexyl glycol cyclohexane-1,4-dicarboxylate, n-heptyl glycol cyclohexane-1,4-dicarboxylate, isoheptyl glycol cyclohexane-1,4-dicarboxylate, n-octyl glycol cyclohexane-1,4-dicarboxylate, isooctyl glycol cyclohexane-1,4-dicarboxylate, 2-ethylhexyl glycol cyclohexane-1,4-dicarboxylate, n-nonyl glycol cyclohexane-1,4-dicarboxylate, isononyl glycol cyclohexane-1,4-dicarboxylate, 2-propylheptyl glycol cyclohexane-1,4-dicarboxylate, n-decyl glycol cyclohexane-1,4-dicarboxylate, isodecyl glycol cyclohexane-1,4-dicarboxylate, n-undecyl glycol cyclohexane-1,4-dicarboxylate, isoundecyl glycol cyclohexane-1,4-dicarboxylate, n-dodecyl glycol cyclohexane-1,4-dicarboxylate, isododecyl glycol cyclohexane-1,4-dicarboxylate, n-tridecyl glycol cyclohexane-1,4-dicarboxylate, isotridecyl glycol cyclohexane-1,4-dicarboxylate, isohexyl n-hexyl cyclohexane-1,4-dicarboxylate, n-heptyl n-hexyl cyclohexane-1,4-dicarboxylate, iso-heptyl n-hexyl cyclohexane-1,4-dicarboxylate, n-octyl n-hexyl cyclohexane-1,4-dicarboxylate, isooctyl n-hexyl cyclohexane-1,4-dicarboxylate, 2-ethylhexyl n-hexyl cyclohexane-1,4-dicarboxylate, n-nonyl n-hexyl cyclohexane-1,4-dicarboxylate, iso-nonyl n-hexyl cyclohexane-1,4-dicarboxylate, 2-propylheptyl n-hexyl cyclohexane-1,4-dicarboxylate, n-decyl n-hexyl cyclohexane-1,4-dicarboxylate, isodecyl n-hexyl cyclohexane-1,4-dicarboxylate, n-undecyl n-hexyl cyclohexane-1,4-dicarboxylate, iso-undecyl n-hexyl cyclohexane-1,4-dicarboxylate, n-dodecyl n-hexyl cyclohexane-1,4-dicarboxylate, isododecyl n-hexyl cyclohexane-1,4-dicarboxylate, n-tridecyl n-hexyl cyclohexane-1,4-dicarboxylate, isotridecyl n-hexyl cyclohexane-1,4-dicarboxylate, n-heptyl isohexyl cyclohexane-1,4-dicarboxylate, isoheptyl isohexyl cyclohexane-1,4-dicarboxylate, n-octyl isohexyl cyclohexane-1,4-dicarboxylate, isooctyl isohexyl cyclohexane-1,4-dicarboxylate, 2-ethylhexyl isohexyl cyclohexane-1,4-dicarboxylate, n-nonyl isohexyl cyclohexane-1,4-dicarboxylate, isononyl isohexyl cyclohexane-1,4-dicarboxylate, 2-propylheptyl isohexyl cyclohexane-1,4-dicarboxylate, n-decyl iso-hexyl cyclohexane-1,4-dicarboxylate, isodecyl isohexyl cyclohexane-1,4-dicarboxylate, n-undecyl isohexyl cyclohexane-1,4-dicarboxylate, isoundecyl isohexyl cyclohexane-1,4-dicarboxylate, n-dodecyl isohexyl cyclohexane-1,4-dicarboxylate, isododecyl iso-hexyl cyclohexane-1,4-dicarboxylate, n-tridecyl isohexyl cyclohexane-1,4-dicarboxylate, isotridecyl isohexyl cyclohexane-1,4-dicarboxylate, isoheptyl n-heptyl cyclohexane-1,4-dicarboxylate, n-octyl n-heptyl cyclohexane-1,4-dicarboxylate, isooctyl n-heptyl cyclohexane-1,4-dicarboxylate, 2-ethylhexyl n-heptyl cyclohexane-1,4-dicarboxylate, n-nonyl n-heptyl cyclohexane-1,4-dicarboxylate, isononyl n-heptyl cyclohexane-1,4-dicarboxylate, 2-propylheptyl n-heptyl cyclohexane-1,4-dicarboxylate, n-decyl n-heptyl cyclohexane-1,4-dicarboxylate, isodecyl n-heptyl cyclohexane-1,4-dicarboxylate, n-undecyl n-heptyl cyclohexane-1,4-dicarboxylate, isoundecyl n-heptyl cyclohexane-1,4-dicarboxylate, n-dodecyl n-heptyl cyclohexane-1,4-dicarboxylate, isododecyl n-heptyl cyclohexane-1,4-dicarboxylate, n-tridecyl n-heptyl cyclohexane-1,4-dicarboxylate, isotridecyl n-heptyl cyclohexane-1,4-dicarboxylate, n-octyl isoheptyl cyclohexane-1,4-dicarboxylate, isooctyl isoheptyl cyclohexane-1,4-dicarboxylate, 2-ethylhexyl isoheptyl cyclohexane-1,4-dicarboxylate, n-nonyl isoheptyl cyclohexane-1,4-dicarboxylate, isononyl isoheptyl cyclohexane-1,4-dicarboxylate, 2-propylheptyl isoheptyl cyclohexane-1,4-dicarboxylate, n-decyl iso-heptyl cyclohexane-1,4-dicarboxylate, isodecyl isoheptyl cyclohexane-1,4-dicarboxylate, n-undecyl isoheptyl cyclohexane-1,4-dicarboxylate, isoundecyl iso-heptyl cyclohexane-1,4-dicarboxylate, n-dodecyl isoheptyl cyclohexane-1,4-dicarboxylate, isododecyl isoheptyl cyclohexane-1,4-dicarboxylate, n-tridecyl iso-heptyl cyclohexane-1,4-dicarboxylate, isotridecyl isoheptyl cyclohexane-1,4-dicarboxylate, isooctyl n-octyl cyclohexane-1,4-dicarboxylate, 2-ethylhexyl n-octyl cyclohexane-1,4-dicarboxylate, n-nonyl n-octyl cyclohexane-1,4-dicarboxylate, isononyl n-octyl cyclohexane-1,4-dicarboxylate, 2-propylheptyl n-octyl cyclohexane-1,4-dicarboxylate, n-decyl n-octyl cyclohexane-1,4-dicarboxylate, isodecyl n-octyl cyclohexane-1,4-dicarboxylate, n-undecyl n-octyl cyclohexane-1,4-dicarboxylate, iso-undecyl n-octyl cyclohexane-1,4-dicarboxylate, n-dodecyl n-octyl cyclohexane-1,4-dicarboxylate, isododecyl n-octyl cyclohexane-1,4-dicarboxylate, n-tridecyl n-octyl cyclohexane-1,4-dicarboxylate, isotridecyl n-octyl cyclohexane-1,4-dicarboxylate, 2-ethylhexyl isooctyl cyclohexane-1,4-dicarboxylate, n-nonyl isooctyl cyclohexane-1,4-dicarboxylate, isononyl isooctyl cyclohexane-1,4-dicarboxylate, 2-propylheptyl iso-octyl cyclohexane-1,4-dicarboxylate, n-decyl isooctyl cyclohexane-1,4-dicarboxylate, isodecyl isooctyl cyclohexane-1,4-dicarboxylate, n-undecyl isooctyl cyclohexane-1,4-dicarboxylate, isoundecyl isooctyl cyclohexane-1,4-dicarboxylate, n-dodecyl iso-octyl cyclohexane-1,4-dicarboxylate, isododecyl isooctyl cyclohexane-1,4-dicarboxylate, n-tridecyl isooctyl cyclohexane-1,4-dicarboxylate, isotridecyl isooctyl cyclohexane-1,4-dicarboxylate, n-nonyl 2-ethylhexyl cyclohexane-1,4-dicarboxylate, isononyl 2-ethylhexyl cyclohexane-1,4-dicarboxylate, 2-propylheptyl 2-ethylhexyl cyclohexane-1,4-dicarboxylate, n-decyl 2-ethylhexyl cyclohexane-1,4-dicarboxylate, isodecyl 2-ethylhexyl cyclohexane-1,4-dicarboxylate, n-undecyl 2-ethylhexyl cyclohexane-1,4-dicarboxylate, isoundecyl 2-ethylhexyl cyclohexane-1,4-dicarboxylate, n-dodecyl 2-ethylhexyl cyclohexane-1,4-dicarboxylate, isododecyl 2-ethylhexyl cyclohexane-1,4-dicarboxylate, n-tridecyl 2-ethylhexyl cyclohexane-1,4-dicarboxylate, isotridecyl 2-ethylhexyl cyclohexane-1,4-dicarboxylate, isononyl n-nonyl cyclohexane-1,4-dicarboxylate, 2-propylheptyl n-nonyl cyclohexane-1,4-dicarboxylate, n-decyl n-nonyl cyclohexane-1,4-dicarboxylate, isodecyl n-nonyl cyclohexane-1,4-dicarboxylate, n-undecyl n-nonyl cyclohexane-1,4-dicarboxylate, isoundecyl n-nonyl cyclohexane-1,4-dicarboxylate, n-dodecyl n-nonyl cyclohexane-1,4-dicarboxylate, isododecyl n-nonyl cyclohexane-1,4-dicarboxylate, n-tridecyl n-nonyl cyclohexane-1,4-dicarboxylate, isotridecyl n-nonyl cyclohexane-1,4-dicarboxylate, 2-propylheptyl isononyl cyclohexane-1,4-dicarboxylate, n-decyl isononyl cyclohexane-1,4-dicarboxylate, isodecyl isononyl cyclohexane-1,4-dicarboxylate, n-undecyl isononyl cyclohexane-1,4-dicarboxylate, isoundecyl isononyl cyclohexane-1,4-dicarboxylate, n-dodecyl isononyl cyclohexane-1,4-dicarboxylate, isododecyl isononyl cyclohexane-1,4-dicarboxylate, n-tridecyl isononyl cyclohexane-1,4- dicarboxylate, isotridecyl iso-nonyl cyclohexane-1,4-dicarboxylate, n-decyl 2-propylheptyl cyclohexane-1,4-dicarboxylate, isodecyl 2-propylheptyl cyclohexane-1,4-dicarboxylate, n-undecyl 2-propylheptyl cyclohexane-1,4-dicarboxylate, isoundecyl 2-propylheptyl cyclohexane-1,4-dicarboxylate, n-dodecyl 2-propylheptyl cyclohexane-1,4-dicarboxylate, isododecyl 2-propylheptyl cyclohexane-1,4-dicarboxylate, n-tridecyl 2-propylheptyl cyclohexane-1,4-dicarboxylate, isotridecyl 2-propylheptyl cyclohexane-1,4-dicarboxylate, isodecyl n-decyl cyclohexane-1,4-dicarboxylate, n-undecyl n-decyl cyclohexane-1,4-dicarboxylate, isoundecyl n-decyl cyclohexane-1,4-dicarboxylate, n-dodecyl n-decyl cyclohexane-1,4-dicarboxylate, isododecyl n-decyl cyclohexane-1,4-dicarboxylate, n-tridecyl n-decyl cyclohexane-1,4-dicarboxylate, isotridecyl n-decyl cyclohexane-1,4-dicarboxylate, n-undecyl isodecyl cyclohexane-1,4-dicarboxylate, isoundecyl iso-decyl cyclohexane-1,4-dicarboxylate, n-dodecyl isodecyl cyclohexane-1,4-dicarboxylate, isododecyl isodecyl cyclohexane-1,4-dicarboxylate, n-tridecyl iso-decyl cyclohexane-1,4-dicarboxylate, isotridecyl isodecyl cyclohexane-1,4-dicarboxylate, isoundecyl n-undecyl cyclohexane-1,4-dicarboxylate, n-dodecyl n-undecyl cyclohexane-1,4-dicarboxylate, isododecyl n-undecyl cyclohexane-1,4-dicarboxylate, n-tridecyl n-undecyl cyclohexane-1,4-dicarboxylate, isotridecyl n-undecyl cyclohexane-1,4-dicarboxylate, n-dodecyl isoundecyl cyclohexane-1,4-dicarboxylate, isododecyl isoundecyl cyclohexane-1,4-dicarboxylate, n-tridecyl iso-undecyl cyclohexane-1,4-dicarboxylate, isotridecyl isoundecyl cyclohexane-1,4-dicarboxylate, isododecyl n-dodecyl cyclohexane-1,4-dicarboxylate, n-tridecyl n-dodecyl cyclohexane-1,4-dicarboxylate, isotridecyl n-dodecyl cyclohexane-1,4-dicarboxylate, n-tridecyl isododecyl cyclohexane-1,4-dicarboxylate, isotridecyl iso-dodecyl cyclohexane-1,4-dicarboxylate, isotridecyl n-tridecyl cyclohexane-1,4-dicarboxylate, methyl cyclohexyl cyclohexane-1,4-dicarboxylate, ethyl cyclohexyl cyclohexane-1,4-dicarboxylate, n-propyl cyclohexyl cyclohexane-1,4-dicarboxylate, iso-propyl cyclohexyl cyclohexane-1,4-dicarboxylate, n-butyl cyclohexyl cyclohexane-1,4-dicarboxylate, tert-butyl cyclohexyl cyclohexane-1,4-dicarboxylate, isobutyl cyclohexyl cyclohexane-1,4-dicarboxylate, glycol cyclohexyl cyclohexane-1,4-dicarboxylate, n-hexyl cyclohexyl cyclohexane-1,4-dicarboxylate, isohexyl cyclohexyl cyclohexane-1,4-dicarboxylate, n-heptyl cyclohexyl cyclohexane-1,4-dicarboxylate, isoheptyl cyclohexyl cyclohexane-1,4-dicarboxylate, n-octyl cyclohexyl cyclohexane-1,4-dicarboxylate, isooctyl cyclohexyl cyclohexane-1,4-dicarboxylate, 2-ethylhexyl cyclohexyl cyclohexane-1,4-dicarboxylate, n-nonyl cyclohexyl cyclohexane-1,4-dicarboxylate, isononyl cyclohexyl cyclohexane-1,4-dicarboxylate, 2-propylheptyl cyclohexyl cyclohexane-1,4-dicarboxylate, n-decyl cyclohexyl cyclohexane-1,4-dicarboxylate, isodecyl cyclohexyl cyclohexane-1,4-dicarboxylate, n-undecyl cyclohexyl cyclohexane-1,4-dicarboxylate, isoundecyl cyclohexyl cyclohexane-1,4-dicarboxylate, n-dodecyl cyclohexyl cyclohexane-1,4-dicarboxylate, isododecyl cyclohexyl cyclohexane-1,4-dicarboxylate, n-tridecyl cyclohexyl cyclohexane-1,4-dicarboxylate, isotridecyl cyclohexyl cyclohexane-1,4-dicarboxylate, methyl isopentyl cyclohexane-1,4-dicarboxylate, ethyl isopentyl cyclohexane-1,4-dicarboxylate, n-propyl isopentyl cyclohexane-1,4-dicarboxylate, isopropyl isopentyl cyclohexane-1,4-dicarboxylate, n-butyl isopentyl cyclohexane-1,4-dicarboxylate, tert-butyl isopentyl cyclohexane-1,4-dicarboxylate, isobutyl isopentyl cyclohexane-1,4-dicarboxylate, glycol isopentyl cyclohexane-1,4-dicarboxylate, n-hexyl isopentyl cyclohexane-1,4-dicarboxylate, isohexyl isopentyl cyclohexane-1,4-dicarboxylate, n-heptyl isopentyl cyclohexane-1,4-dicarboxylate, isoheptyl isopentyl cyclohexane-1,4-dicarboxylate, n-octyl isopentyl cyclohexane-1,4-dicarboxylate, isooctyl isopentyl cyclohexane-1,4-dicarboxylate, 2-ethylhexyl isopentyl cyclohexane-1,4-dicarboxylate, n-nonyl isopentyl cyclohexane-1,4-dicarboxylate, isononyl isopentyl cyclohexane-1,4-dicarboxylate, 2-propylheptyl isopentyl cyclohexane-1,4-dicarboxylate, n-decyl isopentyl cyclohexane-1,4-dicarboxylate, isodecyl isopentyl cyclohexane-1,4-dicarboxylate, n-undecyl isopentyl cyclohexane-1,4-dicarboxylate, isoundecyl isopentyl cyclohexane-1,4-dicarboxylate, n-dodecyl isopentyl cyclohexane-1,4-dicarboxylate, isododecyl isopentyl cyclohexane-1,4-dicarboxylate, n-tridecyl isopentyl cyclohexane-1,4-dicarboxylate, isotridecyl iso-pentyl cyclohexane-1,4-dicarboxylate, methyl n-pentyl cyclohexane-1,4-dicarboxylate, ethyl n-pentyl cyclohexane-1,4-dicarboxylate, n-propyl n-pentyl cyclohexane-1,4-dicarboxylate, isopropyl n-pentyl cyclohexane-1,4-dicarboxylate, n-butyl n-pentyl cyclohexane-1,4-dicarboxylate, tert-butyl n-pentyl cyclohexane-1,4-dicarboxylate, iso-butyl n-pentyl cyclohexane-1,4-dicarboxylate, glycol n-pentyl cyclohexane-1,4-dicarboxylate, n-hexyl n-pentyl cyclohexane-1,4-dicarboxylate, isohexyl n-pentyl cyclohexane-1,4-dicarboxylate, n-heptyl n-pentyl cyclohexane-1,4-dicarboxylate, iso-heptyl n-pentyl cyclohexane-1,4-dicarboxylate, n-octyl n-pentyl cyclohexane-1,4-dicarboxylate, isooctyl n-pentyl cyclohexane-1,4-dicarboxylate, 2-ethylhexyl n-pentyl cyclohexane-1,4-dicarboxylate, n-nonyl n-pentyl cyclohexane-1,4-dicarboxylate, isononyl n-pentyl cyclohexane-1,4-dicarboxylate, 2-propylheptyl n-pentyl cyclohexane-1,4-dicarboxylate, n-decyl n-pentyl cyclohexane-1,4-dicarboxylate, isodecyl n-pentyl cyclohexane-1,4-dicarboxylate, n-undecyl n-pentyl cyclohexane-1,4-dicarboxylate, isoundecyl n-pentyl cyclohexane-1,4-dicarboxylate, n-dodecyl n-pentyl cyclohexane-1,4-dicarboxylate, isododecyl n-pentyl cyclohexane-1,4-dicarboxylate, n-tridecyl n-pentyl cyclohexane-1,4-dicarboxylate and isotridecyl n-pentyl cyclohexane-1,4-dicarboxylate;

cyclohexane-1,3-dicarboxylic acid alkyl esters, such as, for example, monomethyl cyclohexane-1,3-dicarboxylate, dimethyl cyclohexane-1,3-dicarboxylate, diethyl cyclohexane-1,3-dicarboxylate, di-n-propyl cyclohexane-1,3-dicarboxylate, di-n-butyl cyclohexane-1,3-dicarboxylate, di-tert-butyl cyclohexane-1,3-dicarboxylate, diisobutyl cyclohexane-1,3-dicarboxylate, monoglycol cyclohexane-1,3-dicarboxylate, diglycol cyclohexane-1,3-dicarboxylate, di-n-octyl cyclohexane-1,3-dicarboxylate, diisooctyl cyclohexane-1,3-dicarboxylate, di-2-ethylhexyl cyclohexane-1,3-dicarboxylate, di-n-nonyl cyclohexane-1,3-dicarboxylate, diisononyl cyclohexane-1,3-dicarboxylate, di-n-decyl cyclohexane-1,3-dicarboxylate, diisodecyl cyclohexane-1,3-dicarboxylate, di-n-undecyl cyclohexane-1,3-dicarboxylate, diisododecyl cyclohexane-1,3-dicarboxylate, di-n-octadecyl cyclohexane-1,3-dicarboxylate, diisooctadecyl cyclohexane-1,3-dicarboxylate, di-n- eicosyl cyclohexane-1,3-dicarboxylate, monocyclohexyl cyclohexane-1,3-dicarboxylate and dicyclohexyl cyclohexane-1,3-dicarboxylate;

diisopropyl cyclohexane-1,3-dicarboxylate, di-n-hexyl cyclohexane-1,3-dicarboxylate, diisohexyl cyclohexane-1,3-dicarboxylate, di-n-heptyl cyclohexane-1,3-dicarboxylate, diisoheptyl cyclohexane-1,3-dicarboxylate, di-2-propylheptyl cyclohexane-1,3-dicarboxylate, diisoundecyl cyclohexane-1,3-dicarboxylate, di-n-dodecyl cyclohexane-1,3-dicarboxylate, di-n-tridecyl cyclohexane-1,2-dicarboxylate, diisotridecyl cyclohexane-1,3-dicarboxylate, di-n-pentyl cyclohexane-1,3-dicarboxylate and diisopentyl cyclohexane-1,3-dicarboxylate;

cyclohexane-1,2,4-tricarboxylic acid alkyl esters, such as, for example, monomethyl cyclohexane-1,2,4-tricarboxylate, dimethyl cyclohexane-1,2,4-tricarboxylate, diethyl cyclohexane-1,2,4-tricarboxylate, di-n-propyl cyclohexane-1,2,4-tricarboxylate, diisopropyl cyclohexane-1,2,4-tricarboxylate, di-n-butyl cyclohexane-1,2,4-triicarboxylate, di-tert-butyl cyclohexane-1,2,4-tricarboxylate, diisobutyl cyclohexane-1,2,4-tri-carboxylate, monoglycol cyclohexane-1,2,4-tricarboxylate, diglycol cyclohexane-1,2,4-tricarboxylate, di-n-octyl cyclohexane-1,2,4-tricarboxylate, diisooctyl cyclohexane-1,2,4-tricarboxylate, di-2-ethylhexyl cyclohexane-1,2,4-tricarboxylate, di-n-nonyl cyclohexane-1,2,4-tricarboxylate, diisononyl cyclohexane-1,2,4-tricarboxylate, di-n-decyl cyclohexane-1,2,4-tricarboxylate, diisodecyl cyclohexane-1,2,4-tricarboxylate, di-n-undecyl cyclohexane-1,2,4-tricarboxylate, diisododecyl cyclohexane-1,2,4-tricarboxylate, di-n-octadecyl cyclohexane-1,2,4-tricarboxylate, diisooctadecyl cyclohexane-1,2,4-tricarboxylate, di-n-eicosyl cyclohexane-1,2,4-tricarboxylate, monocyclohexyl cyclohexane-1,2,4-tricarboxylate, dicyclohexyl cyclohexane-1,2,4-tricarboxylate, and also trimethyl cyclohexane-1,2,4-tricarboxylate, triethyl cyclohexane-1,2,4-tri-carboxylate, tri-n-propyl cyclohexane-1,2,4-tricarboxylate, tri-n-butyl cyclohexane-1,2,4-tricarboxylate, tri-tert-butyl cyclohexane-1,2,4-tricarboxylate, triisobutyl cyclohexane-1,2,4-tricarboxylate, triglycol cyclohexane-1,2,4-tricarboxylate, tri-n-octyl cyclohexane-1,2,4-tricarboxylate, triisooctyl cyclohexane-1,2,4-tricarboxylate, tri-2-ethylhexyl cyclohexane-1,2,4-tricarboxylate, tri-n-nonyl cyclohexane-1,2,4-tricarboxylate, triisononyl cyclohexane-1,2,4-tricarboxylate, tri-n-decyl cyclohexane-1,2,4-tricarboxylate, triisododecyl cyclohexane-1,2,4-tricarboxylate, tri-n-undecyl cyclohexane-1,2,4-tricarboxylate, triisododecyl cyclohexane-1,2,4-tricarboxylate, tri-n-octadecyl cyclohexane-1,2,4-tricarboxylate, trlisooctadecyl cyclohexane-1,2,4-tricarboxylate, tri-n-eicosyl cyclohexane-1,2,4-tricarboxylate, tricyclohexyl cyclohexane-1,2,4-tricarboxylate, di-n-hexyl cyclohexane-1,2,4-tricarboxylate, diisohexyl cyclohexane-1,2,4-tricarboxylate, tri-n-hexyl cyclohexane-1,2,4-tricarboxylate, triisohexyl cyclohexane-1,2,4-tricarboxylate, di-n-heptyl cyclohexane-1,2,4-tricarboxylate, diisoheptyl cyclohexane-1,2,4-tricarboxylate, tri-n-heptyl cyclohexane-1,2,4-tricarboxylate, triisoheptyl cyclohexane-1,2,4-tricarboxylate, di-n-pentyl cyclohexane-1,2,4-tricarboxylate, diisopentyl cyclohexane-1,2,4-tricarboxylate, tri-n-pentyl cyclohexane-1,2,4-tri-carboxylate, triisopentyl cyclohexane-1,2,4-tricarboxylate, di-n-tridecyl cyclohexane-1,2,4-tricarboxylate, diisotridecyl cyclohexane-1,2,4-tricarboxylate, tri-n-tridecyl cyclohexane-1,2,4-tricarboxylate, triisotridecyl cyclohexane-1,2,4-tricarboxylate, di-n-dodecyl cyclohexane-1,2,4-tricarboxylate, diisoundecyl cyclohexane-1,2,4-tricarboxylate, tri-n-dodecyl cyclohexane-1,2,4-tricarboxylate, trlisoundecyl cyclohexane-1,2,4-tricarboxylate and triisopropyl cyclohexane-1,2,4-tricarboxylate.

Cyclohexane-1,3,5-tricarboxylic acid alkyl esters, such as, for example, monomethyl cyclohexane-1,3,5-tricarboxylate, dimethyl cyclohexane-1,3,5-tricarboxylate, diethyl cyclohexane-1,3,5-tricarboxylate, di-n-propyl cyclohexane-1,3,5-tricarboxylate, di-n-butyl cyclohexane-1,3,5-tricarboxylate, di-tert-butyl cyclohexane-1,3,5-tricarboxylate, diisobutyl cyclohexane-1,3,5-tricarboxylate, monoglycol cyclohexane-1,3,5-tri-carboxylate, diglycol cyclohexane-1,3,5-tricarboxylate, di-n-octyl cyclohexane-1,3,5-tri-carboxylate, diisooctyl cyclohexane-1,3,5-tricarboxylate, di-2-ethylhexyl cyclohexane-1,3,5-tricarboxylate, di-n-nonyl cyclohexane-1,3,5-tricarboxylate, diisononyl cyclohexane-1,3,5-tricarboxylate, di-n-decyl cyclohexane-1,3,5-tricarboxylate, diisodecyl cyclohexane-1,3,5-tricarboxylate, di-n-undecyl cyclohexane-1,3,5-tricarboxylate, diisododecyl cyclohexane-1,3,5-tricarboxylate, di-n-octadecyl cyclohexane-1,3,5-tricarboxylate, diisooctadecyl cyclohexane-1,3,5-tricarboxylate, di-n-eicosyl cyclohexane-1,3,5-tricarboxylate, monocyclohexyl cyclohexane-1,3,5-tricarboxylate, dicyclohexyl cyclohexane-1,3,5-tricarboxylate, and also trimethyl cyclohexane-1,3,5-tricarboxylate, triethyl cyclohexane-1,3,5-tricarboxylate, tri-n-propyl cyclohexane-1,3,5-tricarboxylate, tri-n-butyl cyclohexane-1,3,5-tricarboxylate, tri-tert-butyl cyclohexane-1,3,5-tri-carboxylate, triisobutyl cyclohexane-1,3,5-tricarboxylate, triglycol cyclohexane-1,3,5-tri-carboxylate, tri-n-octyl cyclohexane-1,3,5-tricarboxylate, triisooctyl cyclo hexane-1,3,5-tricarboxylate, tri-2-ethylhexyl cyclohexane-1,3,5-tricarboxylate, tri-n-nonyl cyclohexane-1,3,5-tricarboxylate, triisononyl cyclohexane-1,3,5-tricarboxylate, tri-n-decyl cyclohexane-1,3,5-tricarboxylate, triisododecyl cyclohexane-1,3,5-tricarboxylate, tri-n-undecyl cyclohexane-1,3,5-tricarboxylate, triisododecyl cyclohexane-1,3,5-tricarboxylate, tri-n-octadecyl cyclohexane-1,3,5-tricarboxylate, triisooctadecyl cyclohexane-1,3,5-tricarboxylate, tri-n-eicosyl cyclohexane-1,3,5-tricarboxylate, tricyclohexyl cyclohexane-1,3,5-tricarboxylate, di-n-hexyl cyclohexane-1,3,5-tricarboxylate, diiso-hexyl cyclohexane-1,3,5-tricarboxylate, tri-n-hexyl cyclohexane-1,3,5-tricarboxylate, triisohexyl cyclohexane-1,3,5-tricarboxylate, di-n-heptyl cyclohexane-1,3,5-tricarboxylate, diisoheptyl cyclohexane-1,3,5-tricarboxylate, tri-n-heptyl cyclohexane-1,3,5-tricarboxylate, triisoheptyl cyclohexane-1,3,5-tricarboxylate, di-n-pentyl cyclohexane-1,3,5-tricarboxylate, dilsopentyl cyclohexane-1,3,5-tricarboxylate, tri-n-pentyl cyclohexane-1,3,5-tricarboxylate, triisopentyl cyclohexane-1,3,5-tricarboxylate, di-n-tridecyl cyclohexane-1,3,5-tricarboxylate, diisotridecyl cyclohexane-1,3,5-tricarboxylate, tri-n-tridecyl cyclohexane-1,3,5-tricarboxylate, triisotridecyl cyclohexane-1,3,5-tricarboxylate, di-n-dodecyl cyclohexane-1,3,5-tricarboxylate, diisoundecyl cyclohexane-1,3,5-tricarboxylate, tri-n-dodecyl cyclohexane-1,3,5-tricarboxylate, triisoundecyl cyclohexane-1,3,5-tricarboxylate and triisopropyl cyclohexane-1,3,5-tricarboxylate.

Cyclohexane-1,2,3-tricarboxylic acid alkyl esters, such as, for example, monomethyl cyclohexane-1,2,3-tricarboxylate, dimethyl cyclohexane-1,2,3-tricarboxylate, diethyl cyclohexane-1,2,3-tricarboxylate, di-n-propyl cyclohexane-1,2,3-tricarboxylate, di-n-butyl cyclohexane-1,2,3-tricarboxylate, di-tert-butyl cyclohexane-1,2,3-tricarboxylate, diisobutyl cyclohexane-1,2,3-tricarboxylate, monoglycol cyclohexane-1,2,3-tri-carboxylate, diglycol cyclohexane-1,2,3-tricarboxylate, di-n-octyl cyclohexane-1,2,3-tri-carboxylate, diisooctyl cyclohexane-1,2,3-tricarboxylate, di-2-ethylhexyl cyclohexane-1,2,3-tricarboxylate, di-n-nonyl cyclohexane-1,2,3-tricarboxylate, diisononyl cyclohexane-1,2,3-tricarboxylate, di-n-decyl cyclohexane-1,2,3-tricarboxylate, diisodecyl cyclohexane-1,2,3-tricarboxylate, di-n-undecyl cyclohexane-1,2,3-tricarboxylate, diisododecyl cyclohexane-1,2,3-tricarboxylate, di-n-octadecyl cyclohexane-1,2,3-tricarboxylate, diisooctadecyl cyclohexane-1,2,3-tricarboxylate, di-n-eicosyl cyclohexane-1,2,3-tricarboxylate, monocyclohexyl cyclohexane-1,2,3-tricarboxylate, dicyclohexyl cyclohexane-1,2,3-tricarboxylate, and also trimethyl cyclohexane-1,2,3-tricarboxylate, triethyl cyclohexane-1,2,3-tricarboxylate, tri-n-propyl cyclohexane-1,2,3-tricarboxylate, tri-n-butyl cyclohexane-1,2,3-tricarboxylate, tri-tert-butyl cyclohexane-1,2,3-tri-carboxylate, triisobutyl cyclohexane-1,2,3-tricarboxylate, triglycol cyclohexane-1,2,3-tri-carboxylate, tri-n-octyl cyclohexane-1,2,3-tricarboxylate, triisooctyl cyclohexane-1,2,3-tricarboxylate, tri-2-ethylhexyl cyclohexane-1,2,3-tricarboxylate, tri-n-nonyl cyclohexane-1,2,3-tricarboxylate, triisononyl cyclohexane-1,2,3-tricarboxylate, tri-n-decyl cyclohexane-1,2,3-tricarboxylate, triisododecyl cyclohexane-1,2,3-tricarboxylate, tri-n-undecyl cyclohexane-1,2,3-tricarboxylate, triisododecyl cyclohexane-1,2,3-tricarboxylate, tri-n-octadecyl cyclohexane-1,2,3-tricarboxylate, triisooctadecyl cyclohexane-1,2,3-tricarboxylate, tri-n-eicosyl cyclohexane-1,2,3-tricarboxylate, tricyclohexyl cyclohexane-1,2,3-tricarboxylate, di-n-hexyl cyclohexane-1,2,3-tricarboxylate, diisohexyl cyclohexane-1,2,3-tricarboxylate, tri-n-hexyl cyclohexane-1,2,3-tricarboxylate, triisohexyl cyclohexane-1,2,3-tricarboxylate, di-n-heptyl cyclohexane-1,2,3-tricarboxylate, diisoheptyl cyclohexane-1,2,3-tricarboxylate, tri-n-heptyl cyclohexane-1,2,3-tricarboxylate, triisoheptyl cyclohexane-1,2,3-tricarboxylate, di-n-pentyl cyclohexane-1,2,3-tricarboxylate, diisopentyl cyclohexane-1,2,3-tricarboxylate, tri-n-pentyl cyclohexane-1,2,3-tricarboxylate, triisopentyl cyclohexane-1,2,3-tricarboxylate, di-n-tridecyl cyclohexane-1,2,3-tricarboxylate, diisotridecyl cyclohexane-1,2,3-tricarboxylate, tri-n-tridecyl cyclohexane-1,2,3-tricarboxylate, triisotridecyl cyclohexane-1,2,3-tricarboxylate, di-n-dodecyl cyclohexane-1,2,3-tricarboxylate, diisoundecyl cyclohexane-1,2,3-tricarboxylate, tri-n-dodecyl cyclohexane-1,2,3-tricarboxylate, triisoundecyl cyclohexane-1,2,3-tricarboxylate and triisopropyl cyclohexane-1,2,3-tricarboxylate.

Cyclohexane-1,2,4,5-tetracarboxylic acid alkyl esters, such as, for example, mono-methyl cyclohexane-1,2,4,5-tetracarboxylate, dimethyl cyclohexane-1,2,4,5-tetra-carboxylate, diethyl cyclohexane-1,2,4,5-tetracarboxylate, di-n-propyl cyclohexane-1,2,4,5-tetracarboxylate, di-n-butyl cyclohexane-1,2,4,5-tetracarboxylate, di-tert-butyl cyclohexane-1,2,4,5-tetracarboxylate, diisobutyl cyclohexane-1,2,4,5-tetracarboxylate, monoglycol cyclohexane-1,2,4,5-tetracarboxylate, diglycol cyclohexane-1,2,4,5-tetracarboxylate, di-n-octyl cyclohexane-1,2,4,5-tetracarboxylate, diisooctyl cyclohexane-1,2,4,5-tetracarboxylate, di-2-ethylhexyl cyclohexane-1,2,4,5-tetracarboxylate, di-n-nonyl cyclohexane-1,2,4,5-tetracarboxylate, diisononyl cyclohexane-1,2,4,5-tetracarboxylate, di-n-decyl cyclohexane-1,2,4,5-tetracarboxylate, diisodecyl cyclohexane-1,2,4,5-tetracarboxylate, di-n-undecyl cyclohexane-1,2,4,5-tetracarboxylate, diisododecyl cyclohexane-1,2,4,5-tetracarboxylate, di-n-octadecyl cyclohexane-1,2,4,5-tetracarboxylate, diisooctadecyl cyclohexane-1,2,4,5-tetracarboxylate, di-n-eicosyl cyclohexane-1,2,4,5-tetracarboxylate, monocyclohexyl cyclohexane-1,2,4,5-tetra-carboxylate, trimethyl cyclohexane-1,2,4,5-tetracarboxylate, triethyl cyclohexane-1,2,4,5-tetracarboxylate, tri-n-propyl cyclohexane-1,2,4,5-tetracarboxylate, tri-n-butyl cyclohexane-1,2,4,5-tetracarboxylate, tri-tert-butyl cyclohexane-1,2,4,5-tetracarboxylate, triisobutyl cyclohexane-1,2,4,5-tetracarboxylate, triglycol cyclohexane-1,2,4,5-tetracarboxylate, tri-n-octyl cyclohexane-1,2,4,5-tetracarboxylate, triisooctyl cyclohexane-1,2,4,5-tetracarboxylate, tri-2-ethylhexyl cyclohexane-1,2,4,5-tetra-carboxylate, tri-n-nonyl cyclohexane-1,2,4,5-tetracarboxylate, triisononyl cyclohexane-1,2,4,5-tetracarboxylate, tri-n-decyl cyclohexane-1,2,4,5-tetracarboxylate, triisododecyl cyclohexane-1,2,4,5-tetracarboxylate, tri-n-undecyl cyclohexane-1,2,4,5-tetracarboxylate, triisododecyl cyclohexane-1,2,4,5-tetracarboxylate, tri-n-octadecyl cyclohexane-1,2,4,5-tetracarboxylate, triisooctadecyl cyclohexane-1,2,4,5-tetracarboxylate, tri-n-eicosyl cyclohexane-1,2,4,5-tetracarboxylate, tricyclohexyl cyclohexane-1,2,4,5-tetracarboxylate, and also tetramethyl cyclohexane-1,2,4,5-tetracarboxylate, tetraethyl cyclohexane-1,2,4,5-tetracarboxylate, tetra-n-propyl cyclohexane-1,2,4,5-tetracarboxylate, tetra-n-butyl cyclohexane-1,2,4,5-tetracarboxylate, tetra-tert-butyl cyclohexane-1,2,4,5-tetracarboxylate, tetraisobutyl cyclohexane-1,2,4,5-tetracarboxylate, tetraglycol cyclohexane-1,2,4,5-tetracarboxylate, tetra-n-octyl cyclohexane-1,2,4,5-tetracarboxylate, tetra isooctyl cyclohexane-1,2,4,5-tetracarboxylate, tetra-2-ethylhexyl cyclohexane-1,2,4,5-tetracarboxylate, tetra-n-nonyl cyclohexane-1,2,4,5-tetracarboxylate, tetraisononyl cyclohexane-1,2,4,5-tetracarboxylate, tetra-n-decyl cyclohexane-1,2,4,5-tetracarboxylate, tetraisodecyl cyclohexane-1,2,4,5-tetracarboxylate, tetraisododecyl cyclohexane-1,2,4,5-tetracarboxylate, tetra-n-undecyl cyclohexane-1,2,4,5-tetracarboxylate, tetra-n-octadecyl cyclohexane-1,2,4,5-tetra-carboxylate, tetraisooctadecyl cyclohexane-1,2,4,5-tetracarboxylate, tetra-n-eicosyl cyclohexane-1,2,4,5-tetracarboxylate, tetracyclohexyl cyclo hexane-1,2,4,5-tetra-carboxylate, di-n-hexyl cyclohexane-1,2,4,5-tetracarboxylate, diisohexyl cyclohexane-1,2,4,5-tetracarboxylate, tri-n-hexyl cyclohexane-1,2,4,5-tetracarboxylate, triisohexyl cyclohexane-1,2,4,5-tetracarboxylate, di-n-heptyl cyclohexane-1,2,4,5-tetracarboxylate, diisoheptyl cyclohexane-1,2,4,5-tetracarboxylate, tri-n-heptyl cyclohexane-1,2,4,5-tetracarboxylate, triisoheptyl cyclohexane-1,2,4,5-tetracarboxylate, di-n-pentyl cyclohexane-1,2,4,5-tetracarboxylate, diisopentyl cyclohexane-1,2,4,5-tetracarboxylate, tri-n-pentyl cyclohexane-1,2,4,5-tetracarboxylate, triisopentyl cyclohexane-1,2,4,5-tetracarboxylate, di-n-tridecyl cyclohexane-1,2,4,5- tetracarboxylate, diisotridecyl cyclohexane-1,2,4,5-tetracarboxylate, tri-n-tridecyl cyclohexane-1,2,4,5-tetracarboxylate, triisotridecyl cyclohexane-1,2,4,5-tetracarboxylate, di-n-dodecyl cyclohexane-1,2,4,5-tetracarboxylate, diisoundecyl cyclohexane-1,2,4,5-tetracarboxylate, tri-n-dodecyl cyclohexane-1,2,4,5-tetracarboxylate, triisoundecyl cyclohexane-1,2,4,5-tetracarboxylate, triisopropyl cyclohexane-1,2,4,5-tetracarboxylate, tetra-n-hexyl cyclohexane-1,2,4,5-tetracarboxylate, tetraisohexyl cyclohexane-1,2,4,5-tetracarboxylate, tetra-n-heptyl cyclohexane-1,2,4,5-tetracarboxylate, tetraisoheptyl cyclohexane-1,2,4,5-tetracarboxylate, tetra-n-pentyl cyclohexane-1,2,4,5-tetracarboxylate, tetraisopentyl cyclohexane-1,2,4,5-tetracarboxylate, tetra-n-tridecyl cyclohexane-1,2,4,5-tetra-carboxylate, tetraisotridecyl cyclohexane-1,2,4,5-tetracarboxylate, tetra-n-dodecyl cyclohexane-1,2,4,5-tetracarboxylate, tetraisoundecyl cyclohexane-1,2,4,5-tetra-carboxylate and tetraisopropyl cyclohexane-1,2,4,5-tetracarboxylate.

Also suitable, furthermore, for the purposes of the present invention are the cyclohexane-1,2-dicarboxylic esters which are disclosed in WO 99/32427 and are listed below:

Mixed esters of cyclohexane-1,2-dicarboxylic acid with C1 to C12 alcohols;

cyclohexane-1,2-dicarboxylic acid di(isopentyl) esters, obtainable by hydrogenating di(isopentyl) phthalate with the Chemical Abstracts Registry Number (below: CAS No.) 84777-06-0;

cyclohexane-1,2-dicarboxylic acid di(isoheptyl) esters, obtainable by hydrogenating di(isoheptyl) phthalate with the CAS No. 71888-89-6;

cyclohexane-1,2-dicarboxylic acid di(isononyl) esters, obtainable by hydrogenating a di(isononyl) phthalate with the CAS No. 68515-48-0;

cyclohexane-1,2-dicarboxylic acid di(isononyl) esters, obtainable by hydrogenating a di(isononyl) phthalate with the CAS No. 28553-12-0, based on n-butene;

cyclohexane-1,2-dicarboxylic acid di(isononyl) esters, obtainable by hydrogenating a di(isononyl) phthalate with the CAS No. 28553-12-0, based on isobutene;

a 1,2-di-C9 ester of cyclohexanedicarboxylic acid, obtainable by hydrogenating a di(nonyl) phthalate with the CAS No. 68515-46-8;

a cyclohexane-1,2-dicarboxylic acid di(isodecyl) ester, obtainable by hydrogenating a di(isodecyl) phthalate with the CAS No. 68515-49-1;

a 1,2-di-C7-11 ester of cyclohexanedicarboxylic acid, obtainable by hydrogenating the corresponding phthalic ester with the CAS No. 68515-42-4;

a 1,2-di-C7-11 ester of cyclohexanedicarboxylic acid, obtainable by hydrogenating the di-C7-11 phthalates with the following CAS Nos. 111 381-89-6, 111 381 90-9, 111 381 91-0, 68515-44-6, 68515-45-7 and 3648-20-2;

a 1,2-di-C9-11 ester of cyclohexanedicarboxylic acid, obtainable by hydrogenating a di-C9-11 phthalate with the CAS No. 98515-43-6;

a 1,2-di(isodecyl)cyclohexanedicarboxylic ester, obtainable by hydrogenating a di(isodecyl) phthalate consisting primarily of di(2-propylheptyl) phthalate;

a 1,2-di-C7-9 cyclohexanedicarboxylic ester, obtainable by hydrogenating the corresponding phthalic ester of the branched-chain or linear C7-9 alkyl ester groups; corresponding phthalates which can be used, for example, as starting products have the following CAS Nos:

di-C7,9 alkyl phthalate with the CAS No. 111 381-89-6; di-C7 alkyl phthalate with the CAS No. 68515-44-6; and di-C9 alkyl phthalate with the CAS No. 68515-45-7.

In accordance with the invention it is also possible to use hydrogenation products of phthalic acid mixed esters with C10 and C12 alcohols, as are described in DE-A 100 32 580.7. Furthermore, the hydrogenation products of the commercially available benzenecarboxylic esters with the trade names Jayflex DINP (CAS No. 68515-48-0), Jayflex DIDP (CAS No. 68515-49-1), Palatinol 9-P, Vestinol 9 (CAS No. 28553-12-0), TOTM-I (CAS No. 3319-31-1), Linplast 68-TM, Palatinol N (CAS No. 28553-12-0), Jayflex DHP (CAS No. 68515-50-4), Jayflex DIOP (CAS No. 27554-26-3), Jayflex UDP (CAS No. 68515-47-9), Jayflex DIUP (CAS No. 85507-79-5), Jayflex DTDP (CAS No. 68615-47-9), Jayflex L9P (CAS No. 68515-45-7), Jayflex L911P (CAS No. 68515-43-5), Jayflex L11P (CAS No. 3648-20-2), Witamol 110 (CAS No. 90193-91-2), Witamol 118 (Di-n-C8-C10-alkyl phthalate), Unimoll BB (CAS No. 85-68-7), Linplast 1012 BP (CAS No. 90193-92-3), Linplast 13 XP (CAS No. 27253-26-5), Linplast 610 P (CAS No. 68515-51-5), Linplast 68 FP (CAS No. 68648-93-1) and Linplast 812 HP (CAS No. 70693-30-0), Palatinol AH (CAS No. 117-81-7), Palatinol 711 (CAS No. 68515-42-4), Palatinol 911 (CAS No. 68515-43-5), Palatinol 11 (CAS No. 3648-20-2), Palatinol Z (CAS No. 26761-40-0) and Palatinol DIPP (CAS No. 84777-06-0) are also considered to be suitable for the purposes of the present invention.

Preferred are dialkyl esters of 1,2-cyclohexanedicarboxylic acid. Preference as ester group R is given to linear or branched alkyl groups having 1 to 12 C atoms, or mixtures of the stated alkyl groups. Particularly preferred as ester group R are linear or branched alkyl groups having 6 to 12 C atoms, or mixtures of the stated alkyl groups. Especially preferred as ester group R are alkyl groups having 9 C atoms.

In one preferred embodiment of the invention the cyclohexanecarboxylic ester (I) comprises at least one cyclohexanedicarboxylic acid dialkyl ester. In a further particularly preferred embodiment of the invention the cyclohexanecarboxylic ester (I) is at least one diisononyl 1,2-cyclohexanedicarboxylate.

The diisononyl 1,2-cyclohexanedicarboxylate used may be characterized more closely, in terms of the alcohol component, using the following measurements:

| | |
|---|---|
| Method: | capillary GC |
| Apparatus: | capillary gas chromatograph with autosampler, split/splitless injection system and flame ionization detector (FID) |
| Chemicals: | MSTFA (N-methyl-N-trimethylsilyltrifluoroacetamide) comparatives for determining the retention times |
| Sample preparation: | 3 drops of the sample are held in 1 ml of MSTFA for 60 minutes at 80° C. |
| GC conditions: | capillary column: Ultra-1 |
| | length: 50 m |
| | internal diameter: 0.25 mm |
| | film thickness: 0.1 micrometer |
| | carrier gas: helium |
| | column admission pressure: 200 psi constant |
| | split: 80 ml/min |
| | septum flushing: 3 ml/min |
| | oven temperature: 120° C., 25 min isothermal |
| | injector temperature: 250° C. |
| | detector temperature: 250° C. (FID) |
| | injection volume: 0.5 microliter |

The procedure when calculating the Iso index is evident from the table below.

| Component | Name | Branching | Fraction in area % | Index |
|---|---|---|---|---|
| 1 | 2-Ethyl-2-methylhexan-1-ol | 2 | 1.00 | 0.0200 |
| 2 | 2-Ethyl-4-methylhexan-1-ol | 2 | 1.00 | 0.0200 |
| 3 | 2-Ethyl-4-methylhexan-1-ol | 2 | 1.00 | 0.0200 |
| 4 | 2-Propyl-3-methylpentan-1-ol | 2 | 1.00 | 0.0200 |
| 5 | 2-Propyl-hexan-1-ol | 1 | 1.00 | 0.0100 |
| 6 | 2,5-Dimethylheptan-1-ol | 2 | 1.00 | 0.0200 |
| 7 | 2,3-Dimethylheptan-1-ol | 2 | 1.00 | 0.0200 |
| 8 | 2,3,4-Trimethylhexan-1-ol | 3 | 1.00 | 0.0300 |
| 9 | 2-Ethylheptan-1-ol | 1 | 1.00 | 0.0100 |
| 10 | 3-Ethyl-4-methylhexan-1-ol | 2 | 82.00 | 1.6400 |
| 11 | 3-Ethylheptan-1-ol | 1 | 1.00 | 0.0100 |
| 12 | 2-Methyloctan-1-ol | 1 | 1.00 | 0.0100 |
| 13 | 4,5-Dimethylheptan-1-ol | 2 | 1.00 | 0.0200 |
| 14 | 4,5-Dimethylheptan-1-ol | 2 | 1.00 | 0.0200 |
| 15 | 4-Methyloctan-1-ol | 1 | 1.00 | 0.0100 |
| 15a | 7-Methyloctan-1-ol | 1 | 1.00 | 0.0000 |
| 16 | 6-Methyloctan-1-ol | 1 | 1.00 | 0.0100 |
| 17 | Nonan-1-ol | 0 | 1.00 | 0.0000 |
| 18 | Unknown component | 2 | 1.00 | 0.0200 |
| | | | Iso index: | 1.9200 |

The $C_5$ to $C_{13}$ alcohols are prepared in accordance with the processes identified above. For preparing cyclohexanecarboxylic esters in which R is 9 it is particularly preferred to use a nonanol mixture in which 0% to 20%, preferably 0.5% to 18%, more preferably 6% to 16% by weight of the nonanol mixture contains no branching, 5% to 90%, preferably 10% to 80%, more preferably 45% to 75% by weight contains one branch, 5% to 70%, preferably 10% to 60%, more preferably 15% to 35% by weight contains two branches, 0% to 10%, preferably 0% to 8%, more preferably 0% to 4% by weight contains three branches and 0% to 40%, preferably 0.1% to 30%, more preferably 0.5% to 6.5% by weight is made up of other components. By other components are meant, generally, nonanols having more than three branches, decanols or octanols, the sum of the stated components being 100% by weight.

One particularly preferred embodiment of a nonanol mixture which is used for preparing cyclohexanecarboxylic acid derivatives that are used with preference has the following composition:
  1.73% to 3.73%, preferably 1.93% to 3.53%, more preferably 2.23% to 3.23% by weight of 3-ethyl-6-methylhexanol;
  0.38% to 1.38%, preferably 0.48% to 1.28%, more preferably 0.58% to 1.18% by weight of 2,6-dimethylheptanol;
  2.78% to 4,78%, preferably 2.98% to 4.58%, more preferably 3.28% to 4.28% by weight of 3,5-dimethylheptanol;
  6.30% to 16.30%, preferably 7.30% to 15.30%, more preferably 8.30% to 14.30% by weight of 3,6-dimethylheptanol;
  5.74% to 11.74%, preferably 6.24% to 11.24%, more preferably 6.74% to 10.74% by weight of 4,6-dimethylheptanol;
  1.64% to 3.64%, preferably 1.84% to 3.44%, more preferably 2.14% to 3.14% by weight of 3,4,5-trimethylhexanol;
  1.47% to 5.47%, preferably 1.97% to 4.97%, more preferably 2.47% to 4.47% by weight of 3,4,5-trimethylhexanol, 3-methyl-4-ethylhexanol and 3-ethyl-4-methylhexanol;
  4.00% to 10.00%, preferably 4.50% to 9.50%, more preferably 5.00% to 9.00% by weight of 3,4-dimethylheptanol;
  0.99% to 2.99%, preferably 1.19% to 2.79%, more preferably 1.49% to 2.49% by weight of 4-ethyl-5-methylhexanol and 3-ethylheptanol;
  2.45% to 8.45%, preferably 2.95% to 7.95%, more preferably 3.45% to 7.45% by weight of 4,5-dimethylheptanol and 3-methyloctanol;
  1.21% to 5.21%, preferably 1.71% to 4.71%, more preferably 2.21% to 4.21% by weight of 4,5-dimethylheptanol;
  1.55% to 5.55%, preferably 2.05% to 5.05%, more preferably 2.55% to 4.55% by weight of 5,6-dimethylheptanol;
  1.63% to 3.63%, preferably 1.83% to 3.43%, more preferably 2.13% to 3.13% by weight of 4-methyloctanol;
  0.98% to 2.98%, preferably 1.18% to 2.78%, more preferably 1.48% to 2.48% by weight of 5-methyloctanol;
  0.70% to 2.70%, preferably 0.90% to 2.50%, more preferably 1.20% to 2.20% by weight of 3,6,6-trimethylhexanol;
  1.96% to 3.96%, preferably 2.16% to 3.76%, more preferably 2.46% to 3.46% by weight of 7-methyloctanol;
  1.24% to 3.24%, preferably 1.44% to 3.04%, more preferably 1.74% to 2.74% by weight of 6-methyloctanol;
  0.1% to 3%, preferably 0.2% to 2%, more preferably 0.3% to 1% by weight of n-nonanol;
  25% to 35%, preferably 28% to 33%; more preferably 29% to 32% by weight of other alcohols having 9 and 10 carbon atoms; the sum total of the stated components is 100% by weight.

Another particularly preferred embodiment of a nonanol mixture which is used for preparing cyclohexanecarboxylic acid derivatives that are used with preference has the following composition:
  6.0% to 16.0%, preferably 7.0% to 15.0%, more preferably 8.0% to 14.0% by weight of n-nonanol;
  12.8% to 28.8%, preferably 14.8% to 26.8%, more preferably 15.8% to 25.8% by weight of 6-methyloctanol;
  12.5% to 28.8%, preferably 14.5% to 26.5%, more preferably 15.5% to 25.5% by weight of 4-methyloctanol;
  3.3% to 7.3%, preferably 3.8% to 6.8%, more preferably 4.3% to 6.3% by weight of 2-methyloctanol;
  5.7% to 11.7%, preferably 6.3% to 11.3%, more preferably 6.7% to 10.7% by weight of 3-ethylheptanol;
  1.9% to 3.9%, preferably 2.1% to 3.7%, more preferably 2.4% to 3.4% by weight of 2-ethylheptanol;
  1.7% to 3.7%, preferably 1.9% to 3.5%, more preferably 2.2% to 3.2% by weight of 2-propylhexanol;
  3.2% to 9.2%, preferably 3.7% to 8.7%, more preferably 4.2% to 8.2% by weight of 3,5-dimethylheptanol;
  6.0% to 16.0%, preferably 7.0% to 15.0%, more preferably 8.0% to 14.0% by weight of 2,5-dimethylheptanol;
  1.8% to 3.8%, preferably 2.0% to 3.6%, more preferably 2.3% to 3.3% by weight of 2,3-dimethylheptanol;
  0.6% to 2.6%, preferably 0.8% to 2.4%, more preferably 1.1% to 2.1% by weight of 3-ethyl-4-methylhexanol;
  2.0% to 4.0%, preferably 2.2% to 3.8%, more preferably 2.5% to 3.5% by weight of 2-ethyl-4-methylhexanol;
  0.5% to 6.5%, preferably 1.5% to 6%, more preferably 1.5% to 5.5% by weight of other alcohols having 9 carbon atoms;
the sum total of the stated components being 100% by weight.

In addition to the cyclohexanecarboxylic esters of the formula (I) it is possible, as a further component in the polymer compositions of the invention, to use known plasticizers as well (in an amount, for example, of 0.05% to 3% by weight).

Typical examples are the following compounds:
benzenepolycarboxylic acids and their derivatives, such as, for example:
monomethyl terephthalate, dimethyl terephthalate, diethyl terephthalate, di-n-propyl terephthalate, di-n-butyl terephthalate, di-tert-butyl terephthalate, diisobutyl terephthalate, monoglycol ester of terephthalic acid, diglycol ester of terephthalic acid, di-n-octyl terephthalate, diisooctyl terephthalate, mono-2-ethylhexyl terephthalate, di-2-ethylhexyl terephthalate, di-n-nonyl terephthalate, diisononyl terephthalate, di-n-decyl terephthalate, di-n-undecyl terephthalate, diisodecyl terephthalate, diisododecyl terephthalate, di-n-octadecyl terephthalate, diisooctadecyl terephthalate, di-n-eicosyl terephthalate, monocyclohexyl terephthalate and/or dicyclohexyl terephthalate.
Phthalic esters such as, for example:
monomethyl phthalate, dimethyl phthalate, diethyl phthalate, di-n-propyl phthalate, di-n-butyl phthalate, di-tert-butyl phthalate, diisobutyl phthalate, monoglycol ester of phthalic acid, diglycol ester of phthalic acid, di-n-octyl phthalate, diisooctyl phthalate, di-2-ethylhexyl phthalate, di-n-nonyl phthalate, diisononyl phthalate, di-n-decyl phthalate, diisodecyl phthalate, di-n-undecyl phthalate, diisododecyl phthalate, di-n-octadecyl phthalate, diisooctadecyl phthalate, di-n-eicosyl phthalate, monocyclohexyl phthalate, dicyclohexyl phthalate; alkyl isophthalates such as monomethyl isophthalate, dimethyl isophthalate, diethyl isophthalate, di-n-propyl isophthalate, di-n-butyl isophthalate, di-tert-butyl isophthalate, diisobutyl isophthalate, monoglycol ester of isophthalic acid, diglycol ester of isophthalic acid, di-n-octyl isophthalate, diisooctyl isophthalate, di-2-ethylhexyl isophthalate, di-n-nonyl isophthalate, diisononyl isophthalate, di-n-decyl isophthalate, diisodecyl isophthalate, di-n-undecyl isophthalate, diisododecyl isophthalate, di-n-octadecyl isophthalate, diisooctadecyl isophthalate, di-n-eicosyl isophthalate, monocyclohexyl isophthalate and/or dicyclohexyl isophthalate.
Commercial plasticizers such as:
Palatinol(R) AH (di(2-ethylhexyl) phthalate); Palatinol(R) AH L (di-(2-ethylhexyl) phthalate); Palatinol(R) C (dibutyl phthalate); Palatinol(R) IC (diisobutyl phthalate); Palatinol(R) N(diisononyl phthalate); Palatinol(R) Z (diisodecyl phthalate) Palatinol(R) 10-P (di(2-propylheptyl) phthalate); Palatinol(R) 711P (heptyl undecyl phthalate); Palatinol(R) 911 (nonyl undecyl phthalate); Palatinol(R) 11P-E (diundecyl phthalate); Palatinol(R) M (dimethyl phthalate); Palatinol(R) A (diethyl phthalate); Palatinol(R) A (R) (diethyl phthalate); and Palatinol(R) K (dibutylglycol phthalate). Further examples are the commercially available adipates such as: Plastomoll(R) DOA (di(2-ethylhexyl) adipate) and Plastomoll (R) DNA (diisononyl adipate).

The invention is elucidated in more detail by the examples which follow:

Example 1

Preparation of the Diisononyl Cyclohexanedicarboxylic Ester a) (Butene Dimerization):

The butene dimerization was performed continuously in an adiabatic reactor consisting of two component reactors (length: 4 m each, diameter: 80 cm each) with intermediate cooling, at 30 bar. The feed material used was a raffinate II having the following composition:
Isobutane: 2% by weight
n-Butane: 10% by weight
Isobutene: 2% by weight
But-1-ene: 32% by weight
trans-But-2-ene: 37% by weight
cis-But-2-ene: 17% by weight The catalyst used was a material in accordance with DE 4 339 713, consisting of 50% by weight of NiO, 12.5% by weight of $TiO_2$, 33.5% by weight of $SiO_2$, and 4% by weight of $Al_2O_3$, in the form of 5×5 mm tablets. The conversion was performed with a throughput of 0.375 kg of raffinate II/I of catalyst*h, a recycle rate of $C_4$/raffinate II of 3, an entry temperature to the $1^{st}$ component reactor of 38° C., and an entry temperature to the $2^{nd}$ component reactor of 60° C. The conversion based on the butenes present in the raffinate II was 83.1%; the selectivity for the desired octenes was 83.3%. Fractional distillation of the reactor discharge removed the octene fraction from unreacted raffinate it and the high boilers.

b) (Hydroformylation of the Octene Mixture and Subsequent Hydrogenation):

750 g of the octene mixture prepared in process step 1 were reacted batchwise in an autoclave with 0.13% by weight of dicobalt octacarbonyl $Co_2(O)_8$ as catalyst, with addition of 75 g of water, at 185° C. and under a synthesis gas pressure of 280 bar, with a mixing ratio of $H_2$ to CO of 60/40, for 5 hours. The consumption of synthesis gas, evident from a drop in pressure in the autoclave, was replaced by injecting more. After the autoclave had been let down, the reaction discharge was freed oxidatively from the cobalt catalyst with 10% by weight of acetic acid, by introduction of air, and the organic product phase was hydrogenated with Raney nickel at 125° C. under a hydrogen pressure of 280 bar for 10 hours. Fractional distillation of the reaction discharge removed the isononanol fraction from the C8 paraffins and the high boilers.

c) (Esterification of the Isononanol Fraction):

In the third process step, 865.74 g of the isononanol fraction obtained in process step 2 (20% excess based on phthalic anhydride) were reacted with 370.30 g of phthalic anhydride and 0.42 g of isopropyl butyl titanate as catalyst in a 2 l autoclave with $N_2$ sparging (10 l/h) with a stirring speed of 500 rpm and a reaction temperature of 230° C. The water of reaction formed was removed continuously from the reaction mixture with the $N_2$ stream. The reaction time was 180 minutes. The isononanol excess was subsequently distilled off under a reduced pressure of 50 mbar.

1000 g of the crude diisononyl phthalate were neutralized with 150 ml of 0.5% strength aqueous sodium hydroxide solution, by stirring at 80° C. for 10 minutes. This gave a two-phase mixture having an upper organic phase and a lower aqueous phase (waste liquor comprising hydrolyzed catalyst). The aqueous phase was removed and the organic phase was washed with twice 200 ml of $H_2O$. For further purification, the neutralized and washed diisononyl phthalate was stripped with steam at 180° C. and a reduced pressure of 50 mbar for 2 hours. The purified diisononyl phthalate was then dried at 150° C./50 mbar for 30 minutes by passage of an $N_2$ stream (2 l/h), then stirred with activated carbon for 5 minutes, and filtered off on a suction filter with Supra-Theorit 5 filter aid (temperature 80° C.).

The resultant diisononyl phthalate possesses a density of 0.973 g/cm$^3$, a viscosity of 73.0 mPa*s, a refractive index $n_D^{20}$ of 1.4853, an acid number of 0.03 mg of KOH/g, a water content of 0.03%, and a purity by GC of 99.83%.

d1) (Hydrogenation of the Ester):

A meso/macroporous aluminum oxide support in the form of 4 mm extrudates, possessing a BET surface area of 238 m$^2$/g and a pore volume of 0.45 ml/g, was impregnated with an aqueous ruthenium(III) nitrate solution having a concentration of 0.8% by weight. 0.15 ml/g (approximately 33% of the total volume) of the pores of the support possessed a diameter in the range from 50 nm to 10,000 nm, and 0.30 ml/g (approximately 67% of the total pore volume) of the pores of the support had a pore diameter in the range from 2 to 50 nm. The solution volume taken up by the support in the course of the impregnation corresponded approximately to the pore volume of the support used.

The support impregnated with the ruthenium(III) nitrate solution was subsequently dried at 120° C. and activated (reduced) in a stream of water at 200° C. The catalyst thus produced contained 0.5% by weight of ruthenium, based on the weight of the catalyst.

A continuously operated plant consisting of two tubular reactors connected in series (main reactor 160 ml, $d_{internal}$=12 mm, l=1400 mm, and postreactor 100 ml, $d_{internal}$=12 mm, l=1000 mm) was charged with the catalyst described in the preparation example (main reactor 71.5 g, postreactor 45.2 g). The main reactor was operated with circulation in trickle mode (liquid hourly space velocity 12 m/h), the postreactor in straight pass in liquid phase mode. The phthalic ester prepared in process step 3 was pumped through the reactor cascade (feed 66 g/h) with pure hydrogen at an average temperature of 128° C. in the main reactor and 128° C. in the postreactor, and with a pressure of 200 bar.

The catalyst hourly space velocity in the main reactor was 0.6 kg phthalic ester/$l_{cat.}$×h. Analysis of the reaction discharge by gas chromatography showed that >99.9% of the phthalic ester had been converted. The corresponding cyclohexanedicarboxylic ester was obtained with a selectivity of 99.1%. The phthalic ester prepared in process step 3 was still detectable in the discharge, at 26 ppm. Secondary components detectable were about 0.9% of low boilers (components having a boiling point lower than that of the cyclohexanedicarboxylic ester). The cyclohexanedicarboxylic ester was obtained as a mixture of the cis and trans isomers in a ratio of 92:8. It can be transferred or else used further as it is.

d2) (Hydrogenation of the Ester):

50 g of a meso/macroporous aluminum oxide support in the form of 4 mm extrudates, possessing a BET surface area of 238 m$^2$/g and a pore volume of 0.45 ml/g, was impregnated with an aqueous ruthenium(III) nitrate solution. 2.51 g of the ruthenium-salt solution having a concentration of 0.8% by weight was split into two portions, each of these portions were filled to 16 ml with destined water. The aluminum oxide support was treated with the first half of the solution.

The support impregnated with the ruthenium(III) nitrate solution was subsequently dried at 120° C. and than treated with the second half of the ruthenium solution. The support was activated (reduced) in a stream of hydrogen for 2 hours at 200° C. The support was treated with nitrogen (containing 5% air) for 60 minutes. The catalyst thus produced contained 0.5% by weight of ruthenium, based on the weight of the catalyst.

A continuously operated plant consisting of two tubular reactors connected in series (main reactor 160 ml, $d_{internal}$=12 mm, l=1400 mm, and postreactor 100 ml, $d_{internal}$=12 mm, l=1000 mm) was charged with the catalyst described in the preparation example (main reactor 71.5 g, postreactor 45.2 g). The main reactor was operated with circulation in trickle mode (liquid hourly space velocity 12 m/h), the postreactor in straight pass in liquid phase mode. The phthalic ester prepared in process step 3 was pumped through the reactor cascade (feed 66 g/h) with pure hydrogen at an average temperature of 128° C. in the main reactor and 128° C. in the postreactor, and with a pressure of 200 bar.

The catalyst hourly space velocity in the main reactor was 0.6 kg phthalic ester/$l_{cat.}$×h. Analysis of the reaction discharge by gas chromatography showed that >99.9% of the phthalic ester had been converted. The corresponding cyclohexanedicarboxylic ester was obtained with a selectivity of 99.3%. The phthalic ester prepared in process step 3 was still detectable in the discharge, at 20 ppm. Secondary components detectable were about 0.7% of low boilers (components having a boiling point lower than that of the cyclohexanedicarboxylic ester). The cyclohexanedicarboxylic ester was obtained as a mixture of the cis and trans isomers in a ratio of 91:9. It can be transferred or else used further as it is.

d3) (Hydrogenation of the Ester):

50 kg of a SiO$_2$-support (D11-10 of BASF) in the form of 3 mm extrudates, possessing a BET surface area of 135 m$^2$/g and a water-uptake of 0.95 ml/g, was impregnated with an aqueous ruthenium(III) acetate solution containing 0.176 kg Ru as acetate (Umicore; 4.34% Ru) by weight.

The support impregnated with the ruthenium(III) acetate solution was subsequently dried without movement at 145° C. until a water content of 1% and reduced in a stream of 75% H$_2$ in nitrogen at 200° C. for 90 minutes. The catalyst thus produced contained 0.3% by weight of ruthenium, based on the weight of the catalyst.

A continuously operated plant consisting of two tubular reactors connected in series (main reactor 160 ml, $d_{internal}$=12 mm, l=1400 mm, and postreactor 100 ml, $d_{internal}$=12 mm, l=1000 mm) was charged with the catalyst described in the preparation example (main reactor 71.5 g, postreactor 45.2 g). The main reactor was operated with circulation in trickle mode (liquid hourly space velocity 12 m/h), the postreactor in straight pass in liquid phase mode. The phthalic ester prepared in process step 3 was pumped through the reactor cascade (feed 66 g/h) with pure hydrogen at an average temperature of 128° C. in the main reactor and 128° C. in the postreactor, and with a pressure of 200 bar.

The catalyst hourly space velocity in the main reactor was 0.6 kg phthalic ester/$l_{cat.}$×h. Analysis of the reaction discharge by gas chromatography showed that >99.9% of the phthalic ester had been converted. The corresponding cyclohexanedicarboxylic ester was obtained with a selectivity of 99.5%. The phthalic ester prepared in process step 3 was still detectable in the discharge, at 10 ppm. Secondary components detectable were about 0.5% of low boilers (components having a boiling point lower than that of the cyclohexanedicarboxylic ester). The cyclohexanedicarboxylic ester was obtained as a mixture of the cis and trans isomers in a ratio of 93:7. It can be transferred or else used further as it is.

Example 2

Process for the Suspension Polymerization of Styrene 10 g of dibenzoyl peroxide, 55 g of dicumyl peroxide, and 20 g of Polywachs 2000 prills are dissolved in 19.9 kg of styrene. Furthermore, 20 g of the respective plasticizer, either white oil W 70 (manufacturer: Wintershall, Example 1b) or Hexamoll Dinch (manufacturer: BASF, Example 1a) are added (0.1% by weight based on styrene). The organic phase is introduced into 17.7 l of fully demineralized water in a 50 l stirring vessel. The aqueous phase contains 37.8 g of sodium pyrophosphate (from Giulini) and 70.9 g of magnesium sulfate (bitter salt) (from Kali and Salz). The suspension is heated to 115° C. over the course of 2 hours and then to 123° C. over 2 hours. 1.5 hours after 80° C. have been reached, 1.6 g of emulsifier K30 (manufacturer: Bayer AG) are metered in. After a further hour, 1.1 kg of pentane (blowing agent from Haltermann/manufacturer: Exxon) are added. Lastly, polymerization is completed at a final temperature of 139° C. The polystyrene beads obtained, which contain blowing agent, are decanted off, dried to remove internal water, and optionally coated with a standard EPS coating (composed, for example, of 0.2% to 0.4% of a mixture of glyceryl mono-, di-, and tri-stearates and silica).

The intrinsic viscositys of the degassed polymers were determined by means of a capillary viscometer (micro-Ubbelohde viscometer) by measurement of a solution of the polymers in toluene (see DIN). The intrinsic viscosity (VN) is the ratio of the relative VN-1 and the concentration of the solution measured. The intrinsic viscosity is a variable which is proportional to the molecular weight. The following measurement values were found for the two polystyrenes prepared with the white oil W70 or Hexamoll Dinch additives, respectively:

| Example | | Additive | |
|---|---|---|---|
| | | Hexamoll Dinch 1a | White oil 1b |
| Intrinsic viscosity | [cm³/g] | 88.8 | 89.8 |

Both the average molecular weight and the polydispersity of the polymers obtained when Hexamoll Dinch is added are no different from the reference experiment with white oil. It can therefore be demonstrated that the Hexamoll Dinch additive does not intervene disruptively in the polymerization. In both cases an Mw of around 250 000 g/mol and a polydispersity of around 2.4 were obtained.

Example 3

Expandability of the Styrene Polymer Composition

In order to be able to assess the expandability of the blowing-agent-containing polystyrene granules, the polymer composition is prefoamed at atmospheric pressure in the following apparatus:
  Stork GmbH, Regelungstechnik u. Apparatebau
  Consisting of foaming box with steam supplied via 2 rows of nozzles
  Condenser for air release bridges and condensate removal line
  Control via two FESTO counters (minutes and seconds)
  Two on-switches, which can be operated simultaneously, and an off-switch
  Two positional switches, open and closed (for time start and reset)
  Emergency shutoff
  Internal pressure: 0.01 bar
  Steam pressure: 4 bar
  Control air pressure: 4 bar.

After various residence times in the prefoamer, the gross densities of the partly foamed polymer composition are ascertained. In these measurements, the polymer composition produced with the Hexamoll Dinch additive exhibits outstanding expansion behavior: after 6 minutes' residence time in the prefoamer, gross densities of around 28 g/l can be obtained. In contrast, the polymer composition with the white oil additive can be prefoamed only to a density of 33 g/l after this time.

The results are shown by the following table, as a foaming curve.

| | Example 1a | Example 1b |
|---|---|---|
| | Additive | |
| Residence time in the prefoamer [min] | 0.1% Hexamoll Dinch | 0.1% white oil |
| | Gross density in [g/l] | |
| 2 | 36.8 | 44.5 |
| 4 | 30.6 | 37.4 |
| 6 | 28.3 | 33.8 |
| 8 | 26.9 | 34 |
| 10 | 26.9 | 30.6 |
| 12 | 27 | 29.4 |
| 14 | 27.4 | 29.7 |

Example 4

Analyses on the Mechanical Properties of the Styrene Polymer Compositions

The blowing-agent-containing polymer compositions obtained (granules) are foamed to foam particles by a conventional method and then processed into foam material structures. This gives foams in the density range between 16 to 23 g/l. The foam material structures were tested for their flexural mechanics (in accordance with standard EN 12089 for bending tests; method B) and compressive strength under 10% compression (in accordance with standard EN 826 for compression tests). The foam material produced using the Hexamoll Dinch additive, with a density of around 18 g/l, has a flexural strength which is better by 25%, and, with a density of around 20 g/l, has a flexural strength which is better even by around 40%, as compared with the foam material produced using the white oil additive.

The compressive strength is improved significantly when the white oil additive is replaced by the Hexamoll Dinch additive.

Example 5

Production of a Foam Structure from an EPS Composition with Low Pentane Content

The blowing-agent-containing polystyrene granules obtained in Example 2 are foamed to foam particles by the usual method, and then processed into foam material structures. Foams were obtained in the density range between 16 to 23 g/l. The foam material structures were tested for their flexural mechanics and for compressive strength under 10% compression (see methodology above).

The foam material produced using the Hexamoll Dinch additive has better mechanical properties at a density of around 18 g/l and at around 20 g/l:

TABLE 4

| Plasticizer | | Hexamoll Dinch | | White oil | |
|---|---|---|---|---|---|
| Density | [g/l] | 17.8 | 22.5 | 16.7 | 19.5 |
| Flexural energy | [Nm] | 2.43 | 3.14 | 1.8 | 1.87 |
| Flexural strength | [kPa] | 224.7 | 309.2 | 179.8 | 219.2 |
| Compressive strength | [kPa] | 98.3 | 139.9 | 79.5 | 100.7 |

Example 6

Production of an EPS Composition with Flame Retardant

In a 1000 l reactor, 534 kg of styrene and also 288 g of dibenzoyl peroxide, 2.64 kg of dicumyl peroxide, 3.50 kg of hexabromocyclododecane, and 3.5 kg of Ceridust (PE wax) are dissolved. The respective plasticizer, either white oil W 70 or Hexamoll Dinch, is then dissolved in the styrene phase. The organic phase, in 477 l of fully demineralized water, is introduced into a 1000 l stirring vessel. The aqueous phase contains 47.7 kg of sodium pyrophosphate and 1.96 kg of magnesium sulfate heptahydrate (bitter salt). The suspension is heated to 104° C. over the course of 1.75 hours, and then to 136° C. over 5.5 hours. 1.8 hours after 80° C. have been reached, 90.9 g of 40% strength emulsifier K30 solution (Bayer AG) are metered in. After a further hour, 42.2 kg of pentane are added. Lastly, polymerization is completed at a final temperature of 136° C. The blowing-agent-containing polystyrene beads obtained are decanted off, dried to remove internal water, and coated with a standard EPS coating (0.2% to 0.4% of a mixture of glyceryl mono-, di-, and tristearates and silica).

The following amounts of plasticizers were tested in the EPS:

| Example | Hexamoll Dinch [ppm] | White oil W70 [ppm] | Intrinsic viscosity [cm$^3$/g] | Residual monomer [ppm] |
|---|---|---|---|---|
| 6a | 0 | 0 | 73.8 | 930 |
| 6b | 1000 | 0 | 74.8 | 920 |
| 6c | 0 | 1000 | 73.8 | 1000 |
| 6d | 2000 | 0 | 75.4 | 950 |
| 6e | 0 | 2000 | 74.2 | 920 |
| 6f | 3000 | 0 | 74.5 | 940 |
| 6g | 0 | 3000 | 74.7 | 970 |

The specific additive Hexamoll Dinch can be used very effectively as an alternative to white oil in a standard EPS composition with flame retardant. It does not intervene disruptively in the polymerization. The properties such as intrinsic viscosity (proportional to the molecular weight) and residual monomer remain comparable with corresponding formulas produced with the white oil additive.

The foam material structures produced from the expandable styrene polymers described show increased flexural strength, in the case in which 1000 ppm of Hexamoll Dinch were used as plasticizer, relative to the examples with 1000 ppm of white oil and to the examples without plasticizer.

The positive effect observed on the flexural strength is particularly pronounced with foam ejection pressures of around 1.0 bar and at densities of around 30 μl.

Example 7

Production of an EPS Composition with Flame Retardant and Branching Reagent

In a 40 l reactor, 21.5 kg of styrene and also 6 g of dibenzoyl peroxide, 100 g of dicumyl peroxide, 105 g of hexabromocyclododecane, and 15 g of Polywachs 2000 grills (PE wax) are dissolved. In addition, 1,4-butanediol dimethacrylate (as a branching reagent) is added.

Hexamoll Dinch is subsequently dissolved in the styrene phase. The organic phase, in 19.1 l of fully demineralized water, is introduced into a 40 l stirring vessel. The aqueous phase contains 34.0 g of sodium pyrophosphate and 63 g of magnesium sulfate heptahydrate (bitter salt).

The suspension is heated to 105° C. over the course of 2.56 hours, and then to 126° C. over 4.2 hours. 1.4 hours after 80° C. have been reached, 3.1 g of 40% strength emulsifier K30 solution (Bayer AG) are metered in. After a further 100 minutes, 7.7 kg of pentane are added. Lastly, polymerization is completed at a final temperature of 126° C. The blowing-agent-containing polystyrene beads obtained are decanted off, dried to remove internal water, and coated with a standard EPS coating (0.2% to 0.4% of a mixture of glyceryl mono-, di-, and tristearates and silica).

The styrene polymer compositions tested were as follows:

| Example | Hexamoll Dinch [ppm] | Butanediol methacrylate [ppm] | Intrinsic viscosity [cm$^3$/g] | Mw [g/mol] | Residual monomer [ppm] |
|---|---|---|---|---|---|
| 7a | 3500 | 250 | 97.9 | 320 000 | 860 |
| 7b | 5000 | 250 | 98.8 | 320 000 | 1000 |
| 7c | 3500 | 400 | 108.6 | 460 000 | 960 |
| 7d | 5000 | 400 | 111.9 | 470 000 | 890 |

The viscosity of the styrene polymer compositions produced is measured by means of a micro-Ubbelohde viscometer, micro-Ubbelohde capillary, and thermostat (25° C.; in toluene). Pure toluene (intrinsic viscosity; 68.8 cm$^3$/g) is used for calibration.

The use of a combination of the Hexamoll Dinch additive and a branching reagent in the polymerization results in a significantly improved expandability for the composition as compared with a standard formula without Hexamoll Dinch and without branching reagent (butanediol methacrylate).

Example 8

Production of an EPS Composition with Flame Retardant and Branching Reagent in a 1000 l Reactor 302 g of dibenzoyl peroxide, 2.97 g of dicumyl peroxide, 3.97 kg of hexabromocyclododecane, and 587 g of Ceridust (PE wax) are dissolved in 593 kg of styrene. Additionally, 250 ppm of butanediol methacrylate are added as a branching reagent. 2000 ppm of Hexamoll Dinch are then dissolved in the styrene phase. The organic phase, in 536 l of fully demineralized water, is introduced into a 1000 l stirring vessel. The aqueous phase contains 1.15 kg of sodium pyrophosphate and 2.15 kg of magnesium sulfate heptahydrate (bitter salt).

The suspension is heated to 107° C. over the course of 1.83 hours, and then to 134° C. over 3.4 hours. 1.4 hours after 80° C. have been reached, 103 g of 40% strength emulsifier K30 solution (Bayer AG) are metered in. After a further 60 minutes, 34.1 kg of pentane are added. Lastly, polymerization is completed at a final temperature of 134° C.

The blowing-agent-containing polystyrene beads obtained are decanted off, dried to remove internal water, and coated with a standard EPS coating (0.2% to 0.4% of a mixture of glyceryl mono-, di-, and tristearates and silica).

The foam material structures produced from these expandable polymers exhibit an increased compressive strength in the density range between 11 and 13 g/l, in comparison to a reference formula.

The invention claimed is:

1. A composition comprising at least one expandable styrene polymer component (S) and at least one cyclohexanecarboxylic ester and also optionally further components, wherein the composition comprises at least 90% by weight of the expandable styrene polymer (S), and wherein the composition further comprises 150 ppm to 3.0% by weight of at least one cyclohexanecarboxylic ester of formula (I)

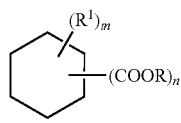
(I)

wherein:
$R^1$ is $C_1$-$C_{10}$ alkyl;
m is 0 or 1;
n is 2 or 3; and
R is $C_6$-$C_{12}$ alkyl;
and wherein the composition comprises optionally up to 8% by weight of one or more further components;
and wherein the expandable styrene polymer (S) is a homopolymer.

2. The composition according to claim 1, wherein the composition comprises at least 90% by weight of a styrene homopolymer (S), and wherein the composition further comprises 150 ppm to 3.0% by weight of at least one cyclohexanecarboxylic ester of the formula (I) in which m is 0, n is 2, and R is $C_8$-$C_{10}$ alkyl, and wherein the composition comprises 0.1% to 8% by weight of one or more further components.

3. A process for producing the composition of claim 1 which comprises polymerizing a styrene monomer and optionally further monomers using the at least one cyclohexanecarboxylic ester of formula (I).

4. The process according to claim 3, wherein the following components are employed in the polymerization, the percent by weight being based on the total amount of all the organic components:
(A) 150 ppm to 3.0% by weight of at least one cyclohexanecarboxylic ester,
(B) at least 95% by weight of styrene monomers, and
(C) optionally up to 5% by weight of further components.

5. The process according to claim 3, wherein further components used comprise at least one component selected from the group consisting of blowing agents, flame retardants, flame retardant synergists, branching auxiliaries, initiators, and graphite.

6. A process for producing a foam material which comprises foaming the composition according to claim 1.

7. A foam material producible by foaming the composition according to claim 1.

8. A foam material produced by thermally foaming the composition according to claim 1, having a density of 8.0 to 200 g/l.

9. A shaped part or packaging material for heat retention or the thermal insulation of machinery and household appliances which comprises the foam material according to claim 7.

10. The process according to claim 3, wherein R is $C_8$-$C_{10}$ alkyl.

11. A foam material produced by thermally foaming a composition according to claim 1, having a density of 10 to 50 g/l.

12. A foam material produced by thermally foaming a composition according to claim 2, having a density of 10 to 50 g/l.

* * * * *